US007467149B2

(12) United States Patent
Gaurav et al.

(10) Patent No.: US 7,467,149 B2
(45) Date of Patent: Dec. 16, 2008

(54) COMPLEX SYNTAX VALIDATION AND BUSINESS LOGIC VALIDATION RULES, USING VAXS (VALUE-ADDED XSDS) COMPLIANT WITH W3C-XML SCHEMA SPECIFICATION

(75) Inventors: Suraj Gaurav, Issaquah, WA (US); Mathrubootham Janakiraman, Redmond, WA (US); Surendra Machiraju, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 11/079,661

(22) Filed: Mar. 14, 2005

(65) Prior Publication Data

US 2006/0206503 A1    Sep. 14, 2006

(51) Int. Cl.
*G06F 7/00* (2006.01)

(52) U.S. Cl. .................... 707/101; 707/104.1; 717/137; 715/237; 715/239

(58) Field of Classification Search .................. 707/4, 707/100, 102, 101, 104.1; 715/512, 237, 715/239; 717/137
See application file for complete search history.

(56) References Cited

U.S. PATENT DOCUMENTS

| | | | |
|---|---|---|---|
| 6,836,890 B1 | 12/2004 | Watts et al. | |
| 6,996,589 B1 | 2/2006 | Jayaram et al. | |
| 2002/0161749 A1 | 10/2002 | Pratt | |
| 2002/0178103 A1* | 11/2002 | Dan et al. ...................... | 705/37 |
| 2003/0088543 A1 | 5/2003 | Skeen et al. | |
| 2003/0130845 A1* | 7/2003 | Poplawski .................. | 704/255 |
| 2003/0225770 A1 | 12/2003 | Lang et al. | |
| 2004/0088320 A1 | 5/2004 | Perry | |
| 2004/0139111 A1 | 7/2004 | Schoettger et al. | |
| 2004/0153405 A1* | 8/2004 | Millary et al. ................. | 705/40 |
| 2004/0177062 A1 | 9/2004 | Urquhart et al. | |
| 2004/0186840 A1 | 9/2004 | Dettinger et al. | |
| 2004/0205562 A1* | 10/2004 | Rozek et al. ................. | 715/513 |
| 2005/0091639 A1* | 4/2005 | Patel .......................... | 717/114 |
| 2005/0108057 A1 | 5/2005 | Cohen et al. | |
| 2005/0114479 A1* | 5/2005 | Watson-Luke .............. | 709/220 |
| 2005/0138048 A1 | 6/2005 | Jin et al. | |
| 2005/0222996 A1 | 10/2005 | Yalamanchi | |
| 2005/0268217 A1 | 12/2005 | Garrison | |
| 2005/0273365 A1* | 12/2005 | Baumgartner et al. .......... | 705/3 |
| 2006/0064428 A1 | 3/2006 | Colaco et al. | |
| 2006/0101058 A1* | 5/2006 | Chidlovskii ................. | 707/102 |
| 2006/0179067 A1 | 8/2006 | Bechtel et al. | |
| 2007/0198539 A1* | 8/2007 | Warshavsky et al. ........ | 707/100 |

OTHER PUBLICATIONS

OA dated Jun. 4, 2008 for U.S. Appl. No. 11/079,424, 220 pages.

* cited by examiner

*Primary Examiner*—Hosain T Alam
*Assistant Examiner*—Amy Ng
(74) *Attorney, Agent, or Firm*—Amin, Turocy & Calvin, LLP

(57) ABSTRACT

Systems and methods are disclosed that facilitate formally describing structured documents and complex validation rules associated therewith using value-added XSD schemas (VAXs). Native XSDs can be utilized and annotated to generate VAXs that represent both the structure of a document and the complex validation rules used to validate the documents. VAXs can be annotated with declarative validation rules that can be assessed at run time to facilitate document validation. Additionally, VAXs can be annotated with validation handlers that comprise a predefined library of validation routines that can be called at run time to facilitate document validation.

16 Claims, 17 Drawing Sheets

COMPLEX SYNTAX VALIDATION AND BUSINESS LOGIC VALIDATION RULES, USING VAXS (VALUE-ADDED XSDS) COMPLIANT WITH W3C-XML SCHEMA SPECIFICATION

CROSS-REFERENCE TO RELATED APPLICATIONS

This application is related to co-filed U.S. patent application Ser. No. 11/079,424 entitled "SINGLE-PASS TRANSLATION OF FLAT-FILE DOCUMENTS INTO XML FORMAT INCLUDING VALIDATION, AMBIGUITY RESOLUTION, AND ACKNOWLEDGEMENT GENERATION" filed on Mar. 14, 2005, and co-filed U.S. patent application Ser. No. 11/079,582, entitled "SCHEMA GENERATOR: QUICK AND EFFICIENT CONVERSION OF HEALTHCARE SPECIFIC STRUCTURAL DATA REPRESENTED IN RELATIONAL DATABASE TABLES, ALONG WITH COMPLEX VALIDATION RULES AND BUSINESS RULES, TO CUSTOM HL7XSD WITH APPLICABLE ANNOTATIONS" filed on Mar. 14, 2005, the entireties of which are incorporated by reference herein.

TECHNICAL FIELD

This invention is related to integration brokers and message processing, and more particularly to formally describing structured documents and complex validation rules associated with such documents using annotated XSD schemas.

BACKGROUND OF THE INVENTION

The evolution of computers and networking technologies from high-cost, low-performance data processing systems to low-cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

With regard to business-to-business applications, message processing and routing is of paramount importance. Integration brokers can be employed to facilitate bi-directional communication between such applications, and are often employed to process millions of messages per day. Large messages require rapid and efficient processing. Modifying messages on an individual basis can be time-consuming and tedious. Thus, an unmet need exists in the art for systems and methodologies that overcome the aforementioned deficiencies.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a model for formally describing structured documents, such as HL7 documents, in an XSD that can be annotated to include information related to validation rules that can be employed to validate document structure, data, and/or business rules, during translation of the document from a flat-file format to an XML format. Validation can be performed at run time to effectuate efficient single-pass translation and validation of a document. Validation annotations can be associated with declarative validation rules with regard to respective nodes in an XSD. At run time, such declarative rules can be read and data related to the specific node associated with the annotation can be extracted and analyzed to per-form validation. Meta data associated with document translation and validation is extremely compact and resides in memory, such that during validation database hits and/or disk input/output need not be performed.

According to a related aspect, validation handlers can be employed to facilitate run-time validation of document structure, data, and rules, during translation (e.g., single-pass validation and translation, . . . ). According to this aspect, a value-added XSD (VAX) can be generated with annotations that relate to validation handler routines that can act on information comprised by a specific schema node with which the annotation is associated in order to facilitate single-pass validation and translation at run time. Validation routines can be written and stored in a library to which a call can be placed upon identification of the annotation at the schema node at run-time, and the validation handler can verify that the proper data is present in a proper structure, etc.

According to another aspect of the subject invention, business rules and/or encoding rules defined in a persistent and relational format can be transformed into extensible markup language (XML) schema that provide message format and validation logic for the message. For example, a schema generator can receive data from a metadata relational database, such as flat-file-delimited data (e.g., a Health Level 7 document, . . . ) native XML schema definitions (XSDs), etc., and can reorganize and annotate (e.g., with business rules, encoding rules, validation rules, grouping orders, . . . ) such data to generate value-added XSDs (VAXs) that facilitate simultaneous conversion of a first message (e.g., document) into a plurality of message versions formatted for transmission to a plurality of different destination applications.

In another aspect of the subject invention, a system is provided that facilitates generating schema compatible with the Health Level 7 (HL7) standards body for application integration in the healthcare provider space. According to this aspect, a schema generator can receive a message that is in a delimited flat-file format and bound by encoding rules defined as "pipe-and-hat" (ER7-HL7). The schema generator can generate an XML schema from a relational database for each message type or transaction type. Messages can then be translated and/or transformed according to preconfigured rules specific to a destination to which the message is to be transmitted.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
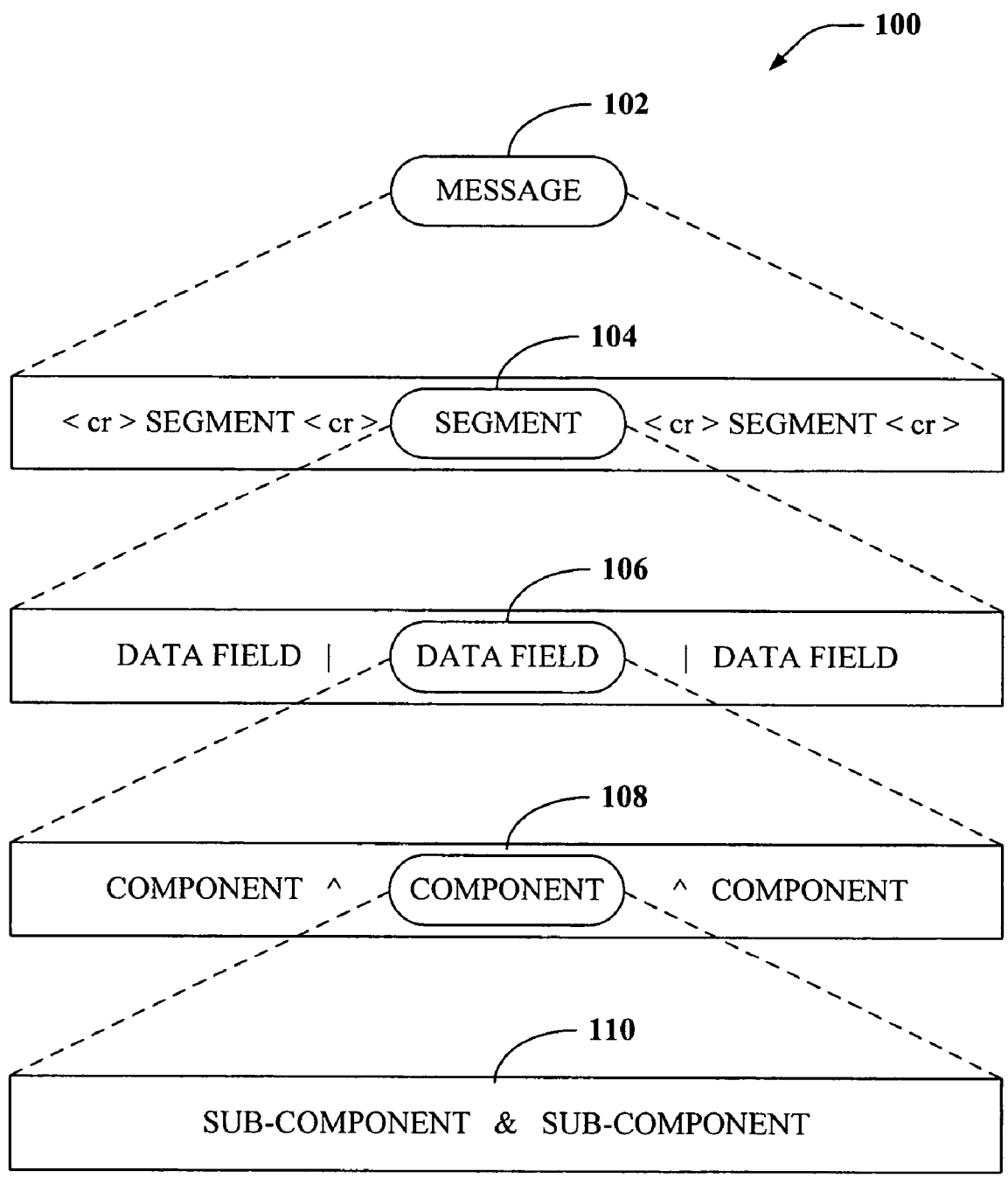
FIG. 1 illustrates a data arrangement 100 for a VAX that can be generated from delimited flat-file data, in accordance with an aspect of the subject invention.

The following terms are used throughout the description, the definitions of which are provided herein to assist in understanding various aspects of the subject invention.

Message: a business document that adheres to one of several well-defined structures that are unambiguously understood by different components of a processing system.

Message format: structural representation of a message, as defined by a business application that sends or receives the message, or as required by a specific industry standard that governs the semantics of the underlying message exchange.

HL7: Health Level Seven, HL7, is an American National Standards Institute (ANSI) approved standards developing organization (SDO). HL7 is considered to be the standards body for application integration in the healthcare provider industry.

ER7: also known as the 'pipe' and 'hat' encoding format. The encoding rules for data to be streamed as delimited flat files.

Message schema/XML schema, or XSD: the specification of the rules that define the set of all possible valid messages in a given message format.

HL7XSD: a representation of the HL7-ER7 encoding rules and structural data in relational database tables, along with complex validation rules and business rules, to customize HL7XSD with applicable annotations.

Message subschema: a subset of the message schema that describes portions of the message.

XSD Engine/Schema Generator/Integration Engine: a software program that is capable of performing both the translation process and the transformation process on a message.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.) can be employed in connection with performing automatic and/or inferred action in connection with the subject invention.

Integration brokers or engines are common in business-to-business (B2B) and enterprise application integration (EAI) applications. The integration brokers can receive messages or data packets in widely varied formats, from various sources, via various transport mechanisms. Pre-configured business rules act on these messages and can trigger other actions. Business rules and validation logic are often expressed in specific forms, such as, for example, extensible markup language (XML) Schema. According to an aspect of the invention, an integration engine can employ a custom XML Schema definition language, such as an HL7XSD version of an XML Schema. Messages can then be routed to other destinations through specified transport mechanisms, after optionally undergoing translation into formats suitable for such destinations. A translation process need not alter the message content, but data in some portions of the message can be altered via a transformation process based on pre-configured rules that are specific to a destination. A single incoming message can thus be broadcast to multiple destinations in a message format acceptable to each destination to which it is broadcast.

The messages can undergo a translation process that converts them from source format to a canonical XML. Converting flat-file messages to XML format allows the messages to be manipulated effectively before they are routed to destination systems and/or applications. Document translation is a complex process involving conversion of source data that can be in a non-XML format to an XML format. In addition to performing the conversion, the subject integration engine can also check to ensure that the data in the message conforms to certain format and/or business rules. Business rules can be complex depending on the specific business application, and can be different for different message originators as well. The ability to capture translation rules and complex validation rules in a single representation is also comprised by the systems and methods described herein.

The subject invention is a new model of formally describing structured documents such as, for example, HL7 documents, along with complex validation rules, using XSD schemas called Value-added-XSDs, or VAXs. VAXs leverage XSD's rich type system to define structures of documents as well as numerous data-validation rules. Additionally, VAXs can extend XSD's capabilities to define data-validation for non-XSD data types, syntax validation, and business rules. Thus, the invention can utilize native XSD constructs to represent both the structure of such documents and the complex validation rules used to validate the documents.

FIG. 1 illustrates a data arrangement 100 for a VAX that can be generated from delimited flat-file data, in accordance with an aspect of the subject invention. A message 102 can be reorganized to comprise one or more segments 104. Each segment 104 can comprise one or more fields 106, which can be delimited by the "|" symbol. Fields can comprise complex data types, simple data types, or a combination thereof. Additionally, fields can be optional. For example, a field's existence can be pendant from the existence of another field, a trigger event, etc. To further this example, a field for the name of a referring doctor is optional until an actual referral is entered and triggers the field's existence.

A field 106 can further comprise one or more components 108, which can also comprise simple data types, complex data types, or both. It will be noted that components 108 are delimited by the "^" symbol. Components 108 can still further comprise one or more subcomponents 110, which can be delimited by the "&" symbol. Subcomponents 110 typically comprise simple data types. Additionally, fields, components, and the like can be associated with one or more enumeration tables (not shown) that can define constant values that can be imported and/or selected (e.g., Mr., Mrs., Ms., Dr., . . . ). In this manner, message content information can be organized to facilitate generation of a VAX, as illustrated with regard to FIGS. 3-5.

Typically, five flat-file delimiters can be specified to facilitate parsing a message when employing ER7 delimiting standards. For example, a "|" symbol can be employed to delimit a particular data field within a segment, while a "^" symbol can be employed to delimit a component within the data field. A "&" symbol can be employed to delimit subcomponents within a component. Other delimiters can optionally include a "\" and a "~", which represent an escape character and a "repeating" delimiter, respectively. For example, the tilde can indicate that data represented in a component delimited thereby is repeated in the message. The backslash indicates that data following the backslash is in fact data, such that an ampersand contained therein is not to be interpreted as a delimiter, but rather as an ampersand. The following example illustrates a simple HL7 flat-file message comprising a header portion, a body portion, and Z-segments that comprise miscellaneous information, which can be parsed and regrouped into a structure similar to that illustrated in FIG. 1.

---

MSH|^~\&|srcAppsrc|srcFac|dstApp|dstFac|200307092343|sec|ADT^A01|
   msgid1|P|2.3.1|||AL
EVN|A01|19880818131811|01
PID||M11|M11||JONES^WILLIAM^A^JR||19310615|M||C|123
   LOCAL DRIVE^ANYTOWN^ST^12345|GL|(999)555-
   1234|(999)555-4321||M|A|M11|987654321|143257NC
NK1|1|WIFE
PV1|1|I|2000|A|||004777,SMITH,JOHN,J.|||SUR|||||A0
ZSeg1|pid231 |any text
ZSeg2|other patient information

---

The above example comprises a message header portion denoted as "MSH," which comprises information related to the delimiter definition, HL7 version employed to create the message, and the like. For instance, "EVN" and "PID" denote segments within the message. The body portion of the message is that portion between the message header and the Z-segments in the message. Fields within an HL7 message can have specified data types associated therewith. For example, fields and components can comprise simple data types as well as complex data types, while subcomponents are typically of simple type. For example, the patient identity segment, "PID," comprises a plurality of fields. One such field comprises a patient name (William A. Jones Jr.) where the individual components of the patient's name within the field are delimited by "^" symbols.

Figure 2:
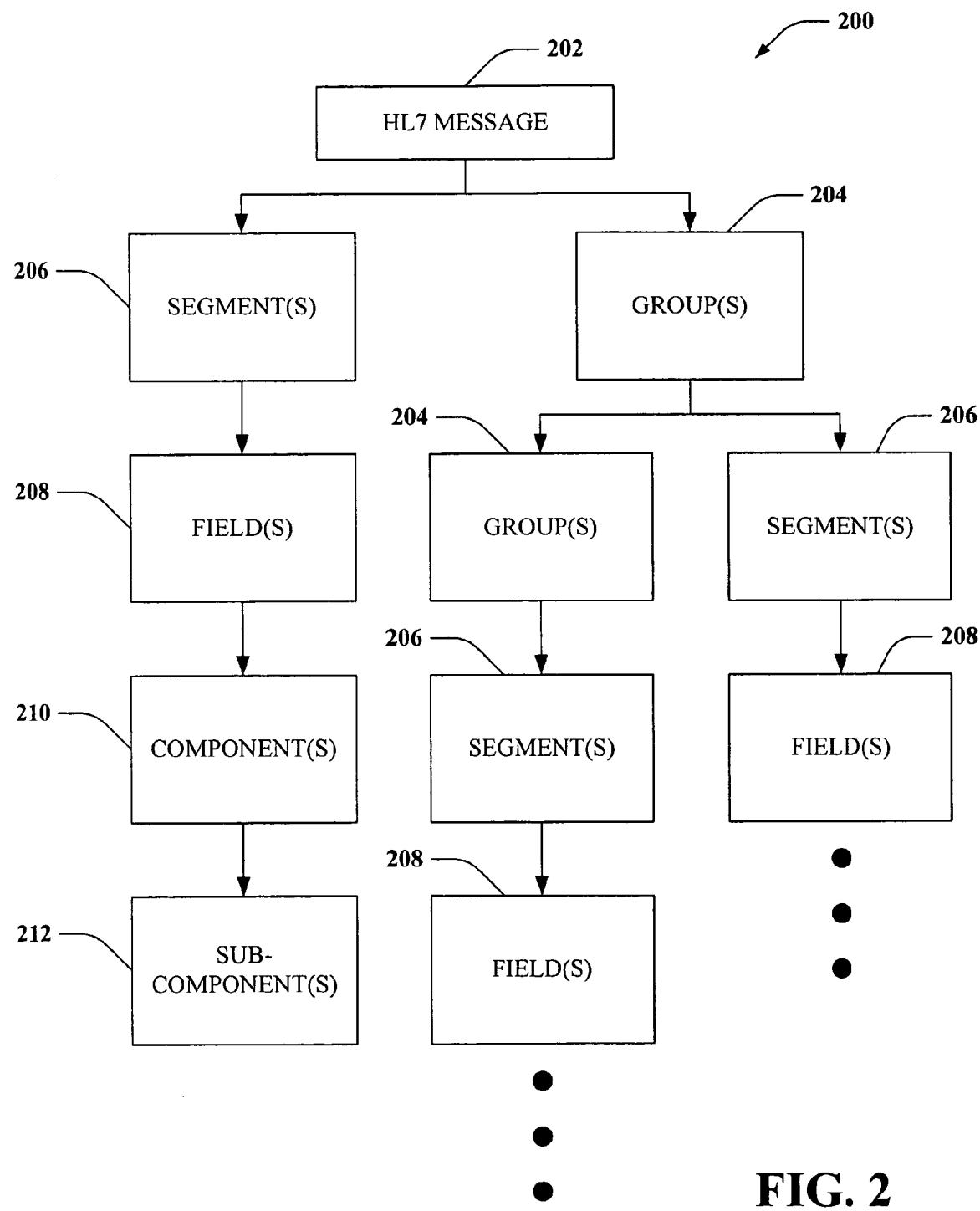
FIG. 2 is an illustration of a grouping hierarchy 200 that can be employed to facilitate generation of a VAX from flat-file delimited data.

FIG. 2 is an illustration of a grouping hierarchy 200 that can be employed to facilitate generation of a VAX from flat-file delimited data. The flat-file message format represented above does not permit segments to be grouped. Segments and/or portions thereof can be grouped by the systems and/or methodologies described herein according to "sequence" and/or "choice" methodologies and a VAX schema can be annotated to define such grouping formats. Additionally, groups can comprise other groups of segments. As illustrated, an HL7 message 202 can be parsed and reorganized into groups 204, which can comprise segments 206 and/or other groups 204 of segments 206. Segments 206 can further comprise fields 208, which in turn can comprise components 210. Finally, components 210 can comprise subcomponents 212. Data types associated with segments 206, fields 208, and/or components 210 can be of a simple type (e.g., int, string, ...) or a complex data type, while sub-component 212 data is typically of a simple type.

Encoding rules used to encode a VAX can comprise, for example, limitations on the number of segments in a group, fields in a segment, components in a field, sub-components in a component, etc. For instance, a segment related to insurance information can be limited to 3 fields, such as "primary insurance," "secondary insurance," and "supplemental insurance." According to another example, a data field such as an "emergency contact" in a PID segment can be limited to 4 components, such as "last name," first name," "title," and "10-digit phone number." According to yet another example, business rules can be defined such that they are subject to change at a specific time. For instance, a first business rule can be tagged as being valid up to a certain date, such as December 31 of a given year, and a second business rule can be tagged as being valid after December 31 of that year, such that at 12:00 a.m. on January 1, the second business rule will be employed to the exclusion of the first. According to this example, the temporal point of 12:00 a.m. January 1 can be a trigger event.

Figure 3:
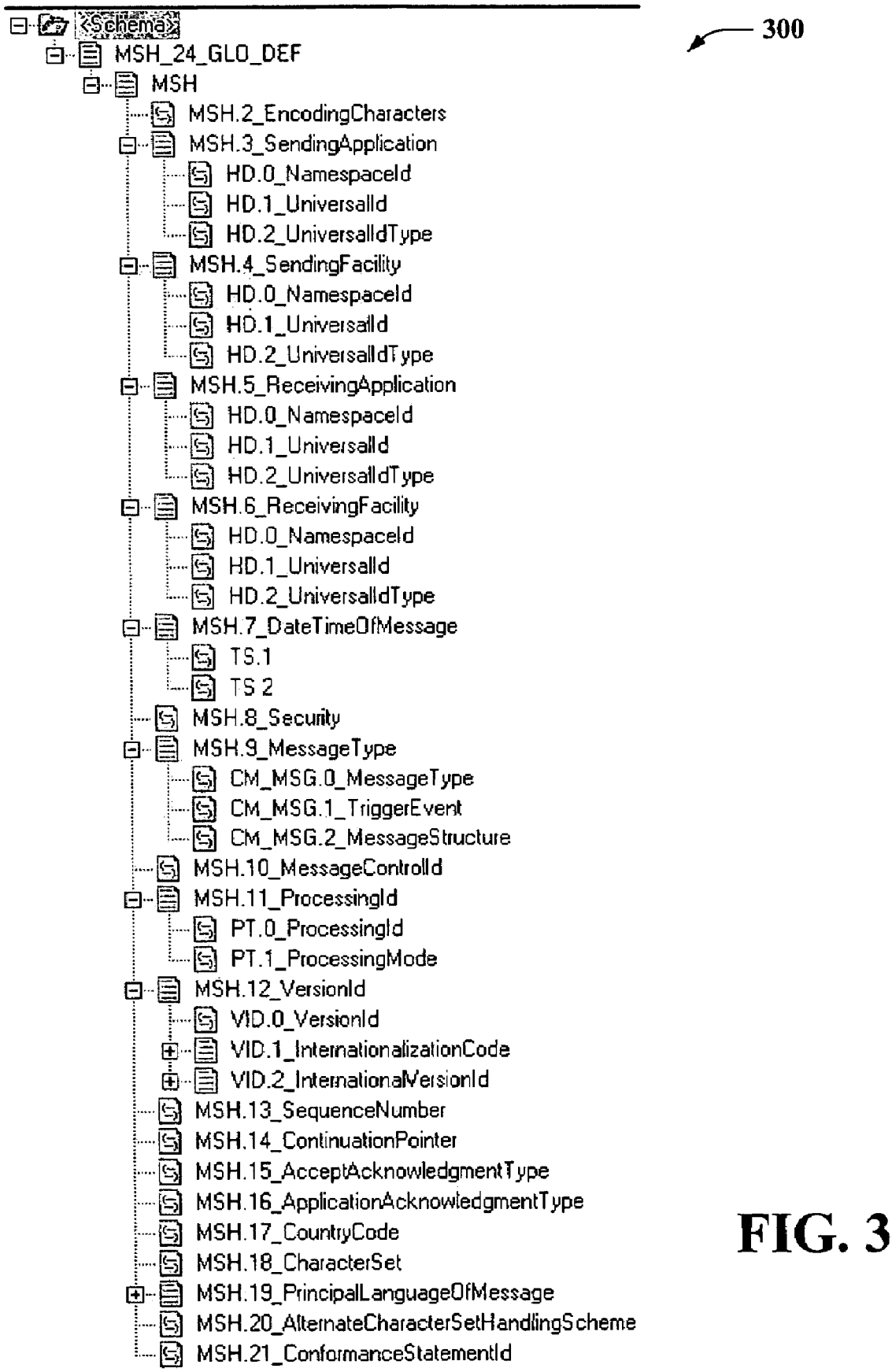
FIG. 3 illustrates a VAX 300 that represents header segments in accordance with an aspect of the subject invention.

FIG. 3 illustrates a VAX 300 that represents header segments in accordance with an aspect of the subject invention. The VAX is illustrated in a tree-view format that has expandable nodes arranged in a hierarchical manner. A primary branch of the VAX tree is labeled "MSH_24_GLO_DEF," indicating that header nodes pending from that branch are globally defined, such that annotations and/or changes made thereto can be provided to change segment, field, component sub-component, etc., at a single location and messages generated thereafter can comprise such updated information and/or schemas. For example, a first node within the global definition branch labeled "MSH" and comprises a plurality of other message header nodes MSH.2-MSH.21. Each of the message header nodes respectively comprises one or more header definitions (e.g., HD.0_NamespaceId, . . . ).

Figure 4:
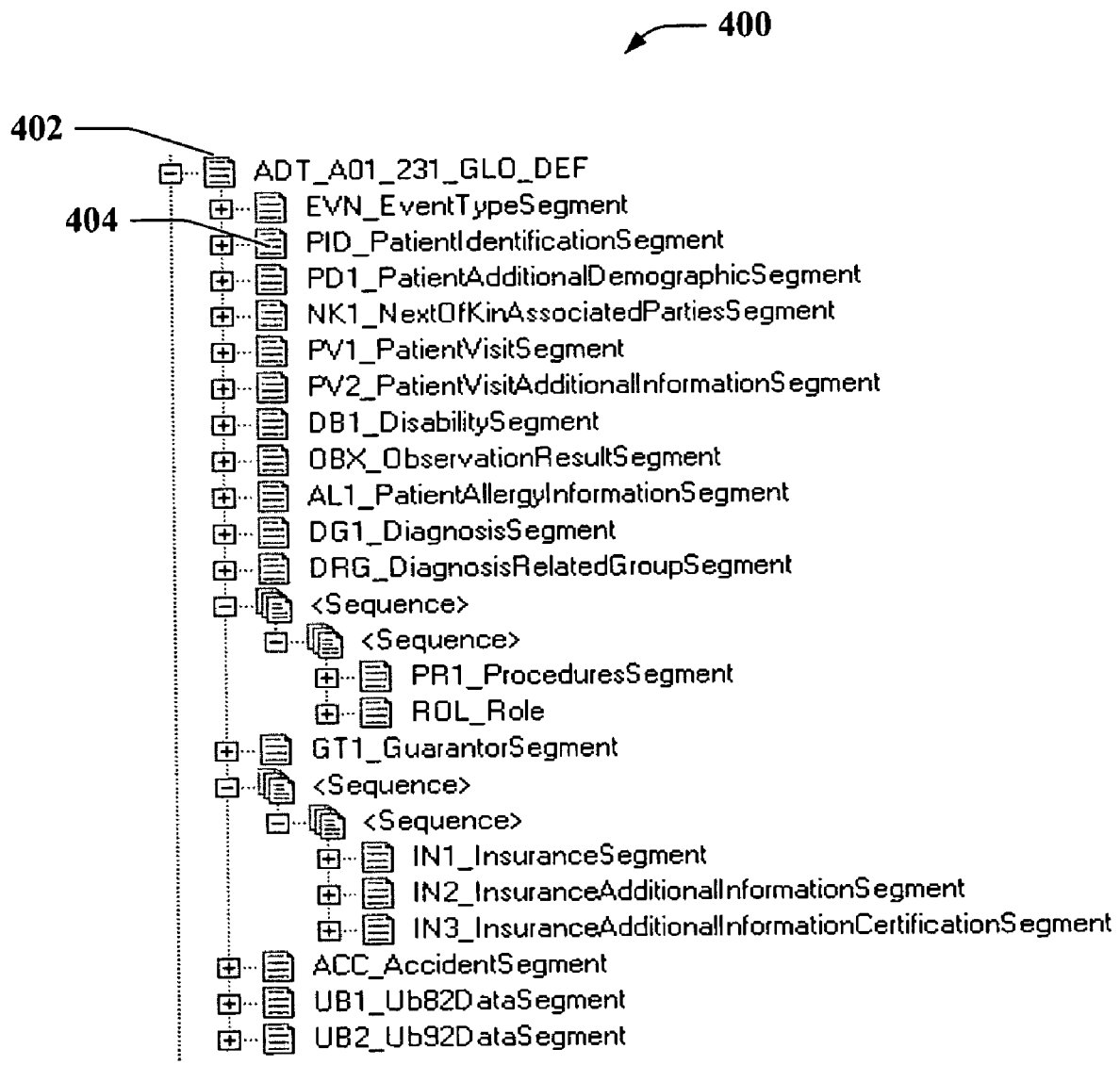
FIG. 4 is an illustration of a tree-view of a VAX 400 representing a body segment of HL7 messages in accordance with an aspect of the subject invention.

FIG. 4 is an illustration of a tree-view of a VAX 400 representing a body segment of HL7 messages in accordance with an aspect of the subject invention. The initial header 402 is labeled "ADT_A01_231_GLO_DEF" and indicates that the message is related to admissions information and provides a global definition for such information. A header for a patient information segment 404 is illustrated as the second primary branch on the VAX tree. Data values changed in the VAX can be globally updated.

Figure 5:
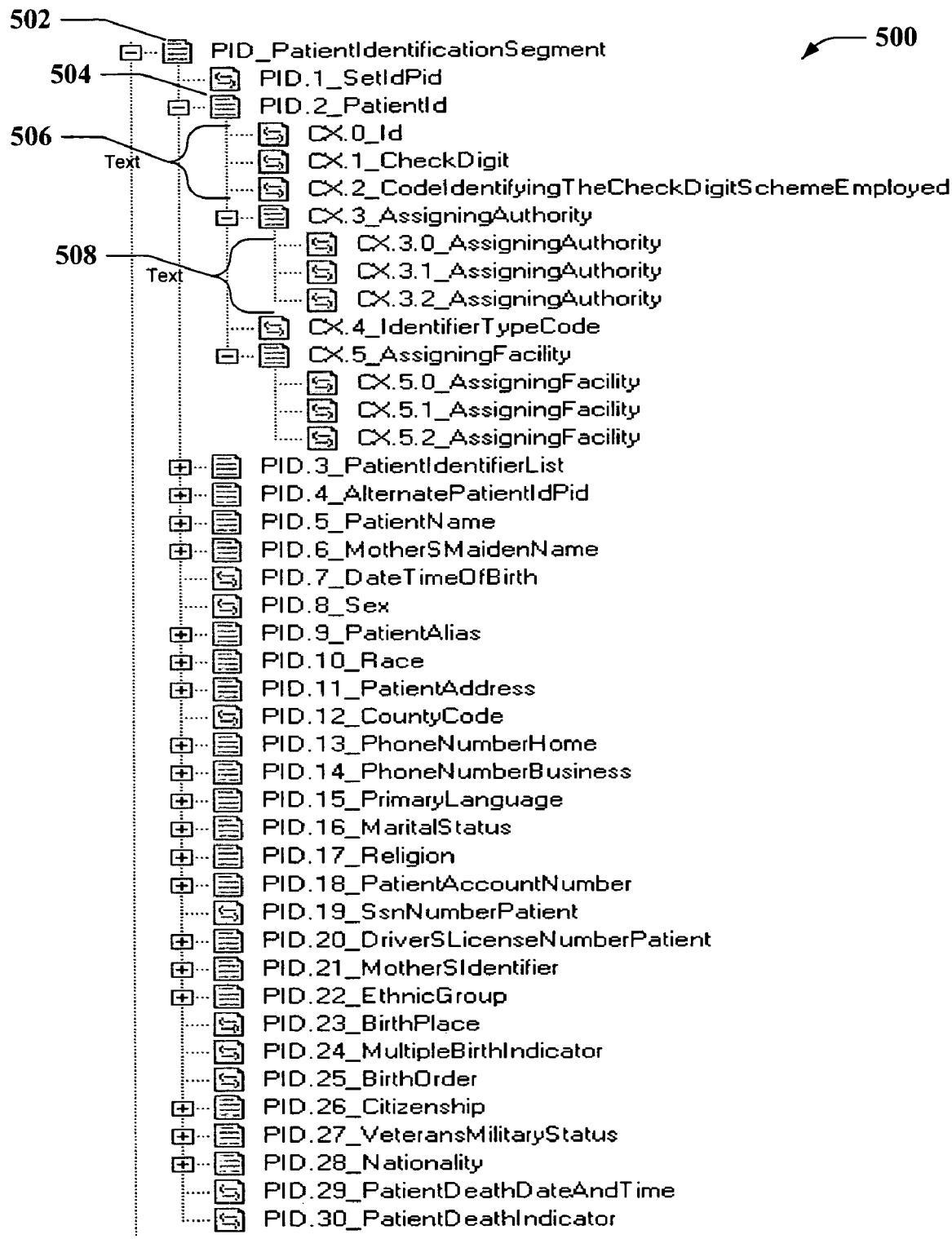
FIG. 5 illustrates a tree-view of a PID segment in a VAX 500 in accordance with an aspect of the subject invention.

FIG. 5 illustrates a tree-view of a PID segment in a VAX 500 in accordance with an aspect of the subject invention. The VAX 500 comprises a hierarchical structure with a PID segment 502 that comprises a plurality of data fields 504 (e.g., PID.1_SetIdPid, PID.2_PatientID, . . . ). The PID.2_PatientId field 504 is expanded to illustrate components 506 thereof (e.g., CX.0_Id, CX.3_AssigningAuthority, . . . ). A component 506 is further expanded to illustrate subcomponents 708 thereof (e.g., CX.3.1_AssigningAuthority, . . . ). Children of respective parent nodes can be arranged according to one or both of sequence and choice ordering schemes. Such ordering schemes can be defined by encoding rules associated with a particular application with which the subject invention is employed, and annotations regarding such encoding rules can be added when generating a VAX.

Figure 6:
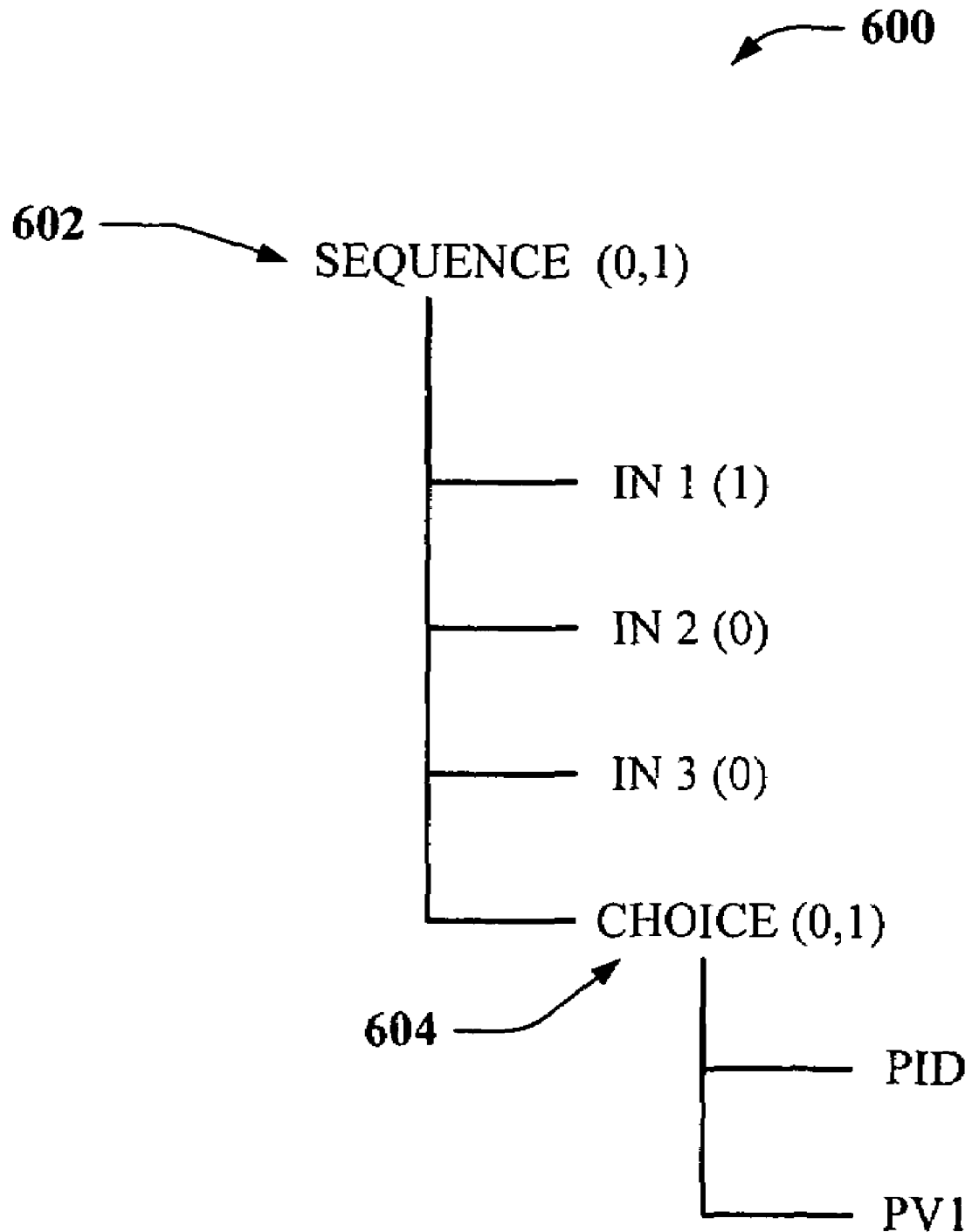
FIG. 6 is an illustration of a simple ordering strucutre 600 that depicts both choice and sequence ordering arrangements for grouping segments, in accordance with an aspect of the subject invention.

FIG. 6 is an illustration of a simple ordering strucutre 600 that depicts both choice and sequence ordering arrangements for grouping segments, in accordance with an aspect of the subject invention. Headers, nodes associated therewith, and the like can be ordered using either "choice" or "sequence" grouping strategies, or a combination thereof. For example, information and/or nodes ordered in sequence are defined such that child elements appear sequentially, and each child element can appear between 0 and n times, where n is an integer. Nodes grouped according to a choice ordering can be specified such that one of a plurality of child elements can occur to the exclusion of other child elements of the same parent. Choice and sequence ordering schemes and/or requirements can be integrated into a VAX as annotations thereto.

According to the figure, a patient's insurance data is shown as having three segments (e.g., IN1, IN2, and IN3). The VAX structure comprises a sequence ordering 602 that has occurrence indicators of (0,1), indicating that each of the "insurance" child segments IN1, IN2 and IN3 can occur 0 or 1 times. Because IN1 is present as illustrated by the (1), IN2 and IN3 are optional as indicated by (0). The sequence 602 further comprises a choice ordering 604, in which either a patient identification segment (PID) or a first patient visit segment (PV1) can exist. In this manner, three different payment methods can be grouped with either a patient's identity or with a particular patient visit. It is to be appreciated that the foregoing example is presented for illustrative purposes and is not intended to limit the number of segments or identities thereof that can be grouped and/or ordered by the subject invention.

Figure 7:
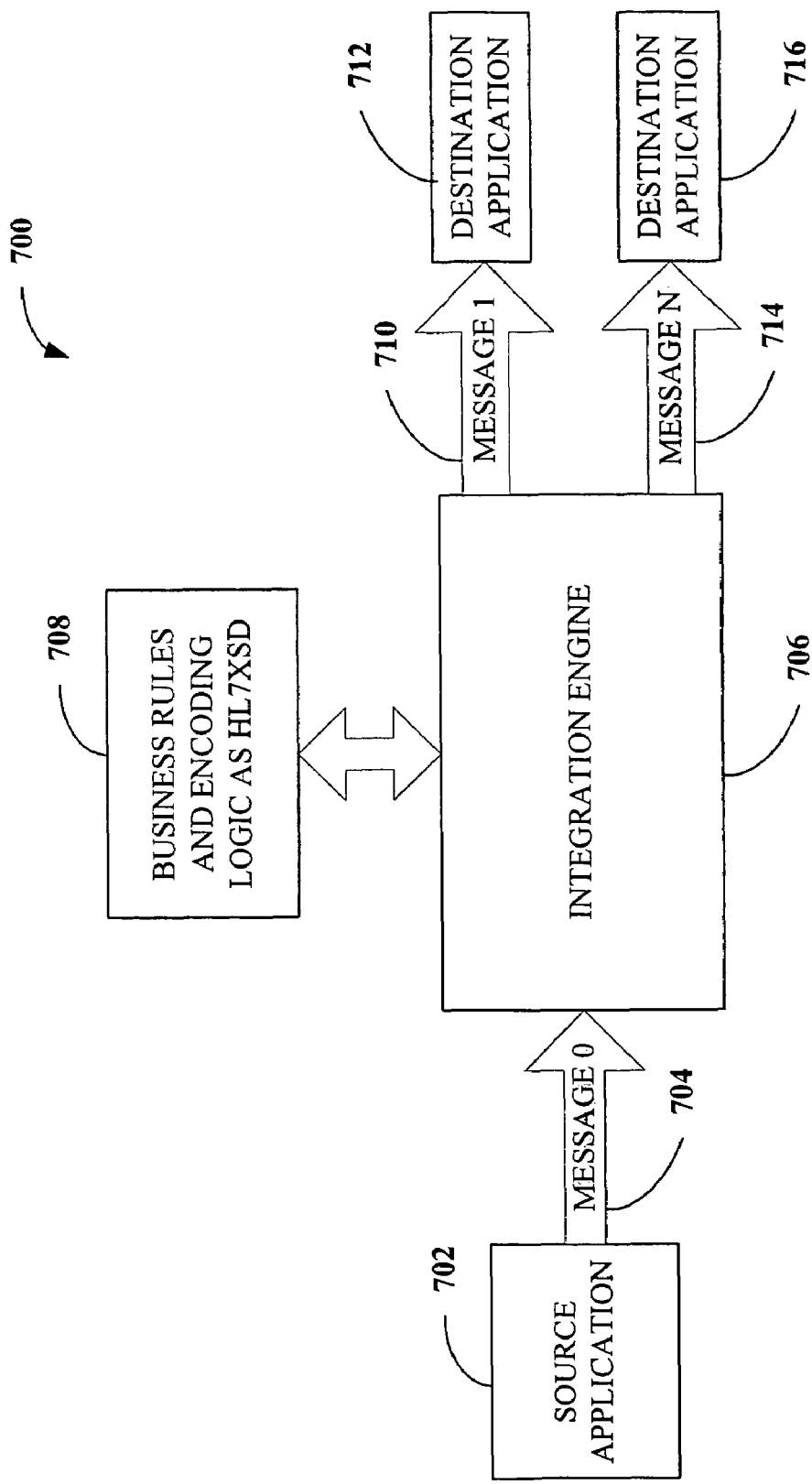
FIG. 7 is an illustration of a system 700 for converting a flat-file-formatted message into one or more VAX-enhanced messages in accordance with an aspect of the subject invention.

FIG. 7 is an illustration of a system 700 for converting a flat-file-formatted message into one or more VAX-enhanced messages in accordance with an aspect of the subject invention. The system 700 comprises a source application 702 that transmits a message 704 to an integration engine 706, which can be similar to and/or comprise a schema generator described infra with regard to FIGS. 10 and 11. The message 704 can be formatted, for instance, as a flat-file native XSD and can contain data related to a particular patient in a health care environment. An HL7XSD (e.g., a VAX) 708 comprising business rules and/or encoding logic germane to the particular health care environment in which the system 700 is employed can be utilized by the integration engine 706 to reformat and validate data in the message 704 in order to generate one or more output messages 710 and 714. The reformatted messages 710 and 714 can then be transmitted to respective destinations 712 and 716. For instance, the source application 702 can be associated with an admissions unit at a health care facility. Upon entry of patient identification information, insurance information, symptom information, etc., a flat-file message 704 comprising such information can be transmitted to the integration engine 706. The integration engine 706 can parse the message 704 and regroup information therein into a VAX format.

For example, a VAX-formatted message 710 can be generated and transmitted to a history application 712, which can generate an acknowledgement and/or update any and all historical data related to the admitted patient. Additionally and/or alternatively, a message 714 can be formatted and transmitted to a financial transaction application 716, wherein patient insurance information, payment method information, balance information, and the like can be stored, updated, etc. For instance, a financial transaction application might typically consume fifty types of messages. Modifying a locally identified value fifty times can be tedious and detrimental to system function. However, by modifying the value globally (e.g., in the schema), the system 700 can streamline message transmission and processing efficiency. Other application destinations to which messages can be transmitted from the integration engine can include without being limited to, for example, a triage application where priority information can be stored and/or updated, a laboratory application where information related to lab workups can be received and/or prepared, and the like.

Figure 8:
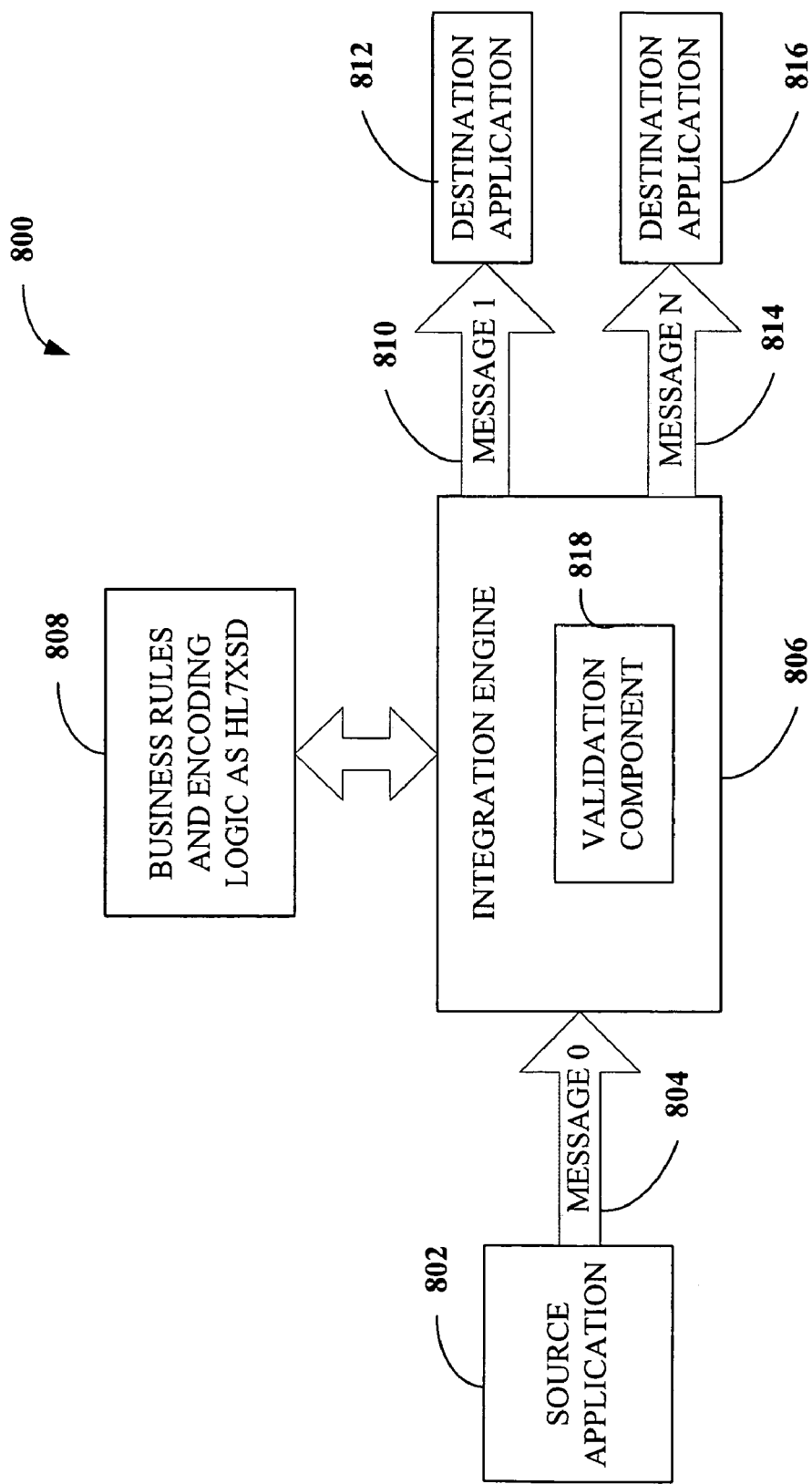
FIG. 8 is an illustration of a system 800 for converting a flat-file-formatted message into one or more VAX-enhanced messages in accordance with an aspect of the subject invention.

FIG. 8 is an illustration of a system 800 for converting a flat-file-formatted message into one or more VAX-enhanced messages in accordance with an aspect of the subject invention. The system 800 comprises a source application 802 that can transmit a flat-file-delimited message 804 to an integration engine 806. The flat-file message 804 can be formatted, for instance, as a native XSD and can contain data related to a particular patient and/or occurrence related to a health care environment. An HL7XSD (e.g., a VAX) 808 comprising business rules and/or encoding logic germane to the particular health care environment in which the system 800 is employed can be utilized by the integration engine 806 to reformat and validate data in the flat-file message 804 in order to generate one or more output messages 810 and 814. The reformatted messages 810 and 814 can then be transmitted to respective destinations 812 and 816. For instance, the source application 802 can be associated with an admissions unit at a health care facility. Upon entry of patient identification information, insurance information, symptom information, etc., a flat-file message 804 comprising such information can be transmitted to the integration engine 806. The integration engine 806 can parse the message 804 and regroup information therein into a VAX-enhanced XML format.

The integration engine 806 further comprises a validation component 818 that facilitates utilizing complex validation rules described in a VAX. Such validation rules can extend XSD capabilities to define data validation for non-XSD data types, as well as syntax validation rules and/or business rules that can apply to specific source and/or destination applications that respectively transmit and receive messages manipulated by the integration engine 806. For example, a VAX such as an HL7XSD 808 can be employed to express and/or represent HL7 data. According to this example, a VAX schema can comprise a number of segments and/or groups that comprise segments. Groups can be either choice or sequence, as detained with regard to FIG. 6. Each segment can comprise on or more fields, which can repeat and can be of a simple data type or can have components that describe a complex data type in a field. Additionally, a component can represent an atomic data type or can have one or more sub-components, which typically comprise data of a simple type. The VAX schema comprises all sub-components in the hierarchy regardless of whether a specific sub-component delimiter is present in the instance, as illustrated supra with regard to FIGS. 3-5. Schemas themselves need not comprise delimiter information: delimiters can be applied to the schema when the document represented thereby is translated.

Data validation rules can be represented by the HL7XSD 808 (e.g., VAX, . . . ) as well. For example, certain validation rules can apply to leaf-level nodes of the VAX, and annotations pertaining thereto can be provided in the VAX such that at runtime the validation component 818 can assess validation rules associated with the annotated VAX and can validate data in messages. For instance, data types (e.g., int, string, . . . ) in the nodes can be supported natively by an XSD. Additionally, data types in the schema and/or nodes thereof can be custom data types that are recognized by the integration engine 806. For example, with regard to HL7 data, such data types can comprise "DateTime," "TimeStamp," "TelephoneNumber," etc.

Additionally, cross-validation and business rules can be represented in the HL7XSD 808 and can be assess and/or utilized by the validation component 818 at translation time to validate information in a message. For example, specific business rules can operate on data residing at one or more nodes in the schema. To further this example, a business rule can dictate that "if node x is valued, then node y should also be valued. The VAX can represent such business rules and the validation component 818 can extract sufficient data from a schema to perform validation of the rule at run time (e.g., the validation component 818 can ensure that if x is valued y is also valued, . . . ). In this manner, the validation component 818 facilitates performing a single pass of a flat-file message 804 or document at run time for translation as well as validation of document structure, data, and rules.

Figure 9:
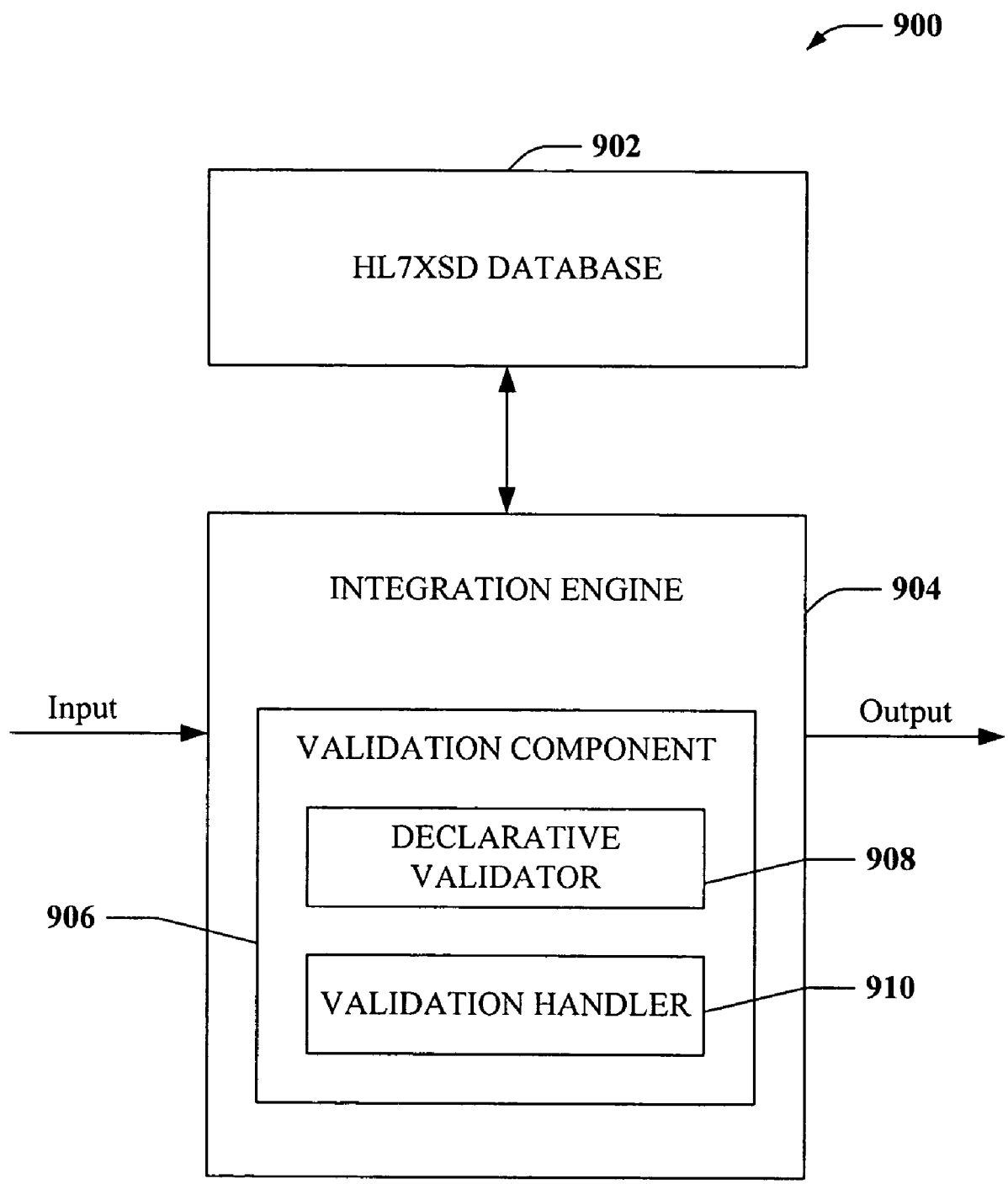
FIG. 9 is an illustration of a system 900 that facilitates providing single pass translation of a flat-file document along with validation of document structure, data, and business rules associated with the document, in accordance with an aspect of the subject invention.

Now referring to FIG. 9, there is illustrated a system 900 that facilitates providing single pass translation of a flat-file document along with validation of document structure, data, and business rules associated with the document, in accordance with an aspect of the subject invention. The system 900 comprises a VAX database 902 that stores VAXs associated with messages that can be received by an integration engine 904. The integration engine 904 comprises a validation component 906 similar to the validation component described with regard to FIG. 8. The validation component 906 further comprises a declarative validator 908 that facilitates employing declarative rules to validate a message and a validation handler 910 that can comprise a predefined library of validation routines that can be performed on messages being translated by the integration engine 904. The declarative validator 908 and the validation component 910 can be used in conjunction with each other and/or can be used separately to facilitate data validation.

For example, XSD annotations that describe declarative rules can be specified at the nodes of a VAX. The integration engine 904 can parse the annotations to read through them, and the declarative validator 908 can apply the rules to relevant portions of the document or message being modified by the integration engine 904. An example of such an annotation is presented below. In the ADT_A01 schema (FIG. 4), if component CX.0_Id of PatientId (FIG. 5) is valued, then DateTimeOfBirth (FIG. 5) should also be valued. In this case, the schema can be annotated to contain the following:

```
<xs:annotation>
    <xs:appinfo>
        <ruleNS:CrossFieldValidationRule>
            <ruleNS:Condition>
                <ruleNS:XPath>PID_PatientIdentificationSegment^PID.
                    2_PatientId^CX.0_Id</ruleNS:XPath>
                <ruleNS:Operator>is</ruleNS:Operator>
                <ruleNS:Value>NotNull</ruleNS:Value>
            </ruleNS:Condition>
            <ruleNS:Then>
                <ruleNS:XPath>PID_PatientIdentificationSegment^
                    PID.7_DateTimeOfBirth</ruleNS:XPath>
                <ruleNS:Operator>is</ruleNS:Operator>
                <ruleNS:Value>NotNull</ruleNS:Value>
            </ruleNS:Then>
        </ruleNS:CrossFieldValidationRule>
    </xs:appinfo>
</xs:annotation>
```

The language employed to describe the rules can be arbitrarily complex, and the engine 904 can be designed to ensure that it is capable of interpreting the complex language.

According to a related example, the validation handler 910 can be specified using XSD annotations in the VAX. One or more validation handlers 910 can be written and stored as a library with predefined routines for performing validation. For instance, a validation handler 910 can be designed that dynamically looks up information from other sources, tables, etc., to provide real-time validation when relevant. For example, real-time validation can be useful to validate a stock symbol or quote, a baseball score, and/or any other information type that is likely to change frequently. The following is an example of a validation handler annotation that can be specified in a VAX. In ADT_A01 schema, the value of component CX.0_Id of PatientId can only take values from a given set. This set can be retrieved at runtime by making a call to a helper routine. In this case, the schema can be annotated to contain the following:

```
<xs:annotation>
  <xs:appinfo>
    <ruleNS:DataRestrictionRule>
      <ruleNS:NodeXPath>
        PID__PatientIdentificationSegment^PID.
          2__PatientId^CX.0__Id</ruleNS:XPath>
      </ruleNS: NodeXPath >
      <ruleNS:ValidationHandler>
        <ruleNS:AssemblyName>ValidationUtilities</ruleNS:
        AssemblyName>
        <ruleNS:ClassName>PIDValidation</ruleNS:ClassName>
        <ruleNS:MethodName>ValidatePID1 </ruleNS:MethodName>
      </ruleNS:ValidationHandler >
    </ruleNS:DataRestrictionRule >
  </xs:appinfo>
</xs:annotation>
```

Figure 10:
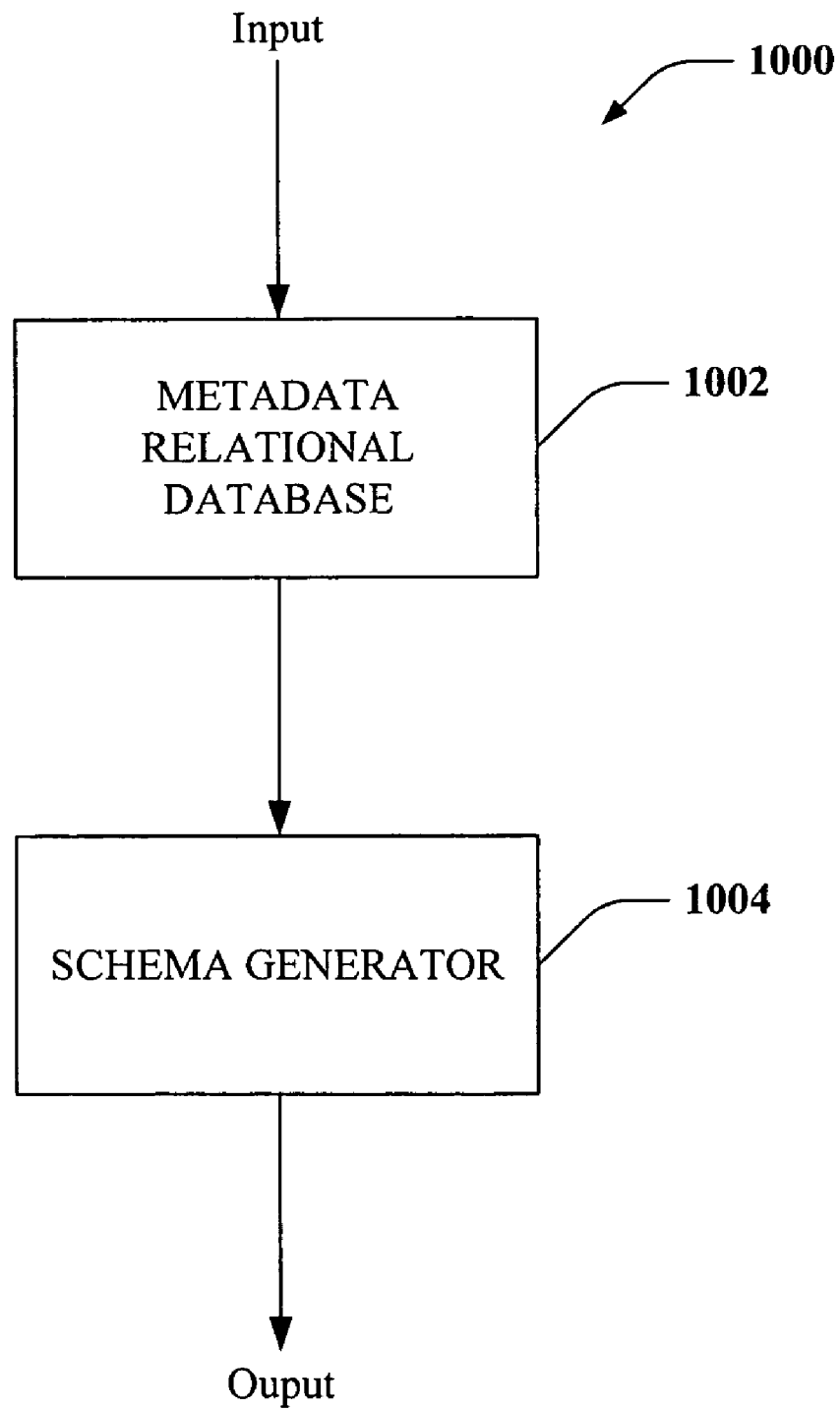
FIG. 10 illustrates a system 1000 that facilitates generating value-added XML schema from flat-file delimited data stored in a relational database in accordance with an aspect of the subject invention.

Referring now to FIG. 10, there is illustrated a system 1000 that facilitates generating value-added XML schema from flat-file delimited data stored in a relational database in accordance with an aspect of the subject invention. Input can be received and/or stored by a metadata relational database 1002 that is operatively coupled to a schema generator 1004. The relational database 1002 can comprise a set of data items organized as formally described tables. Data items can be reorganized, accessed, reassembled, and the like in myriad ways without reorganization of the tables themselves. Tables in the database 1002 can contain one or more data categories, usually in columns. Rows in the database 1002 can comprise unique instances of data for the categories defined in the respective columns. Columns in the database 1002 can be associated with predefined domains that delineate possible values that can reside in a data column. Additionally, constraints can be assigned to data values and/or domains comprising such data values. A table of metadata can be generated that comprises formal descriptions of tables, columns, rows, domains, and constraints associated with the database 1002. Relational databases are easily extensible, and information categories can be added to extant relational databases without requiring modification to applications that employ such databases.

Input messages can be formatted as, for example, external data representations (XDRs), data type definitions (DTDs), native XML schema definitions (XSDs), and the like. Messages stored in the relational database 1002 can comprise, for instance, a header portion that defines delimiters employed to facilitate parsing the flat-file data, and a body portion that comprises information represented as flat-file data. The schema generator 1004 can parse the native XSD (and/or other input type), generate two groups of schemas (e.g., metadata schemas and business rule schemas) based on the native file (typically in an HL7-ER7 format), link the two schemas together, and add annotations to generate a value-added XSD (VAX), which can then be output and stored to facilitate global modification of metadata and/or generation of multiple versions of messages. When parsing a message, the schema generator can parse a header therefore and can configure itself with the values of delimiters that need to be used to further parse the document structure. However, the delimiter information need not be present in the schemas.

Based on information contained in the flat-file message, the schema generator 1004 can construct two sets of schemas. A first set of schemas can represent encoding rules as metadata schemas, which can comprise representations of segments, data fields, data types (e.g., fields, components, subcomponents . . . ), and the like. A second group of schemas can represent business rules associated with the message. Business rules define trigger events associated with the message. For example, a trigger event can be an admissions message, a doctor referral, a message regarding a transfer between wards, a message related to discharge of a patient, etc. Each trigger event can be described by a schema: for instance, the exemplary schema "O001__231_GLO_DEF.xsd" can require that "Segment__231.xsd" be imported, along with "Fields__231.xsd" and "Tables__231.xsd." A business rule schema can additionally comprise a list of segments and/or groups that are associated with a specific trigger event. A single VAX can then be generated that comprises both the business rules and the metadata schemas, such that each VAX is associated with a particular message type.

According to an aspect of the invention, the schema generator 1004 can analyze both a translation specification and a transformation specification for a message and can convert the message simultaneously into a plurality of messages suitable for delivery to different destination applications. This aspect facilitates generation of VAXs in an extensible manner that allows versioning information to be stored, which is desirable when integrating different business applications that use variants of the same schema. Thus, multiple versions of a single segment can be stored such that a first application can utilize a first version and a second application can utilize a second version, etc. Changes made to a particular segment, field, component, sub-component, etc., can be immediately reflected in all schemas that consume the particular segment, field, component, sub-component, etc. Additionally, during message translation, messages can undergo a comprehensive validation process that can detect errors therein. Errors can be corrected using data manipulation technology, such as an XML document/form editor and the like. For instance, different versions of forms can be generated for each schema by the schema generator 1004.

Figure 11:
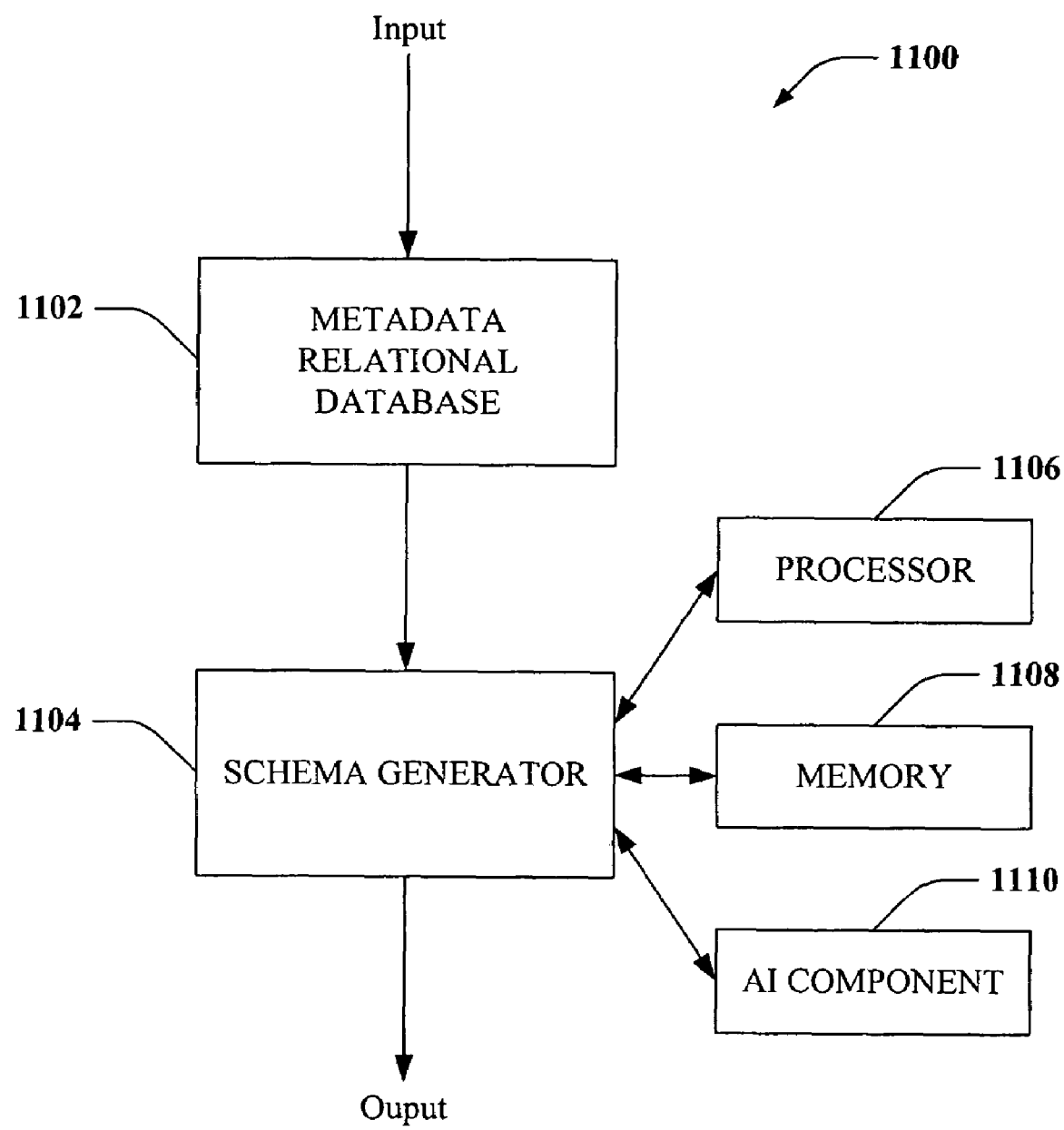
FIG. 11 is an illustration of a system 1100 that facilitates VAX generation in accordance with an aspect of the subject invention.

Referring now to FIG. 11, there is illustrated a system 1100 that facilitates VAX generation in accordance with an aspect of the subject invention. The system 1100 comprises a metadata relational database 1102 and a schema generator 1104 as discussed with regard to FIG. 10. The metadata relational database 1102 can receive and store information such as a native XSD, delimited flat-file, etc. The schema generator 1104 can parse segments of the native XSD in order to generate a VAX that represents information from the native XSD as well as information related to validation logic and/or business rules employed to destination-specific versions of the XSD message. Such VAXs can be associated with trigger events (e.g., included in the business rules, annotations, etc.) that dictate when a particular version of a message is to be transmitted to its target destination. Additionally, VAXs can be associated with sub-library schemas that comprise information related to encoding rules for the XML message.

The schema generator 1104 can be further operatively coupled to a processor 1106 that analyzes data received and/or generated by the schema generator 1104, and a memory 1108 that stores information associated with system operations. It is to be appreciated that the processor 1106 can be a processor dedicated to analyzing information received by the schema generator 1104, a processor that controls one or more components of the system 1100, and/or a processor that both analyzes information received by the schema generator 1104 and controls one or more components of the system 1100.

The memory 1108 can additionally store protocols associated with generating VAXs from data stored in the relational database 1102, such that the system 1100 can employ stored protocols and/or algorithms to parse flat file XSD segments, to group segments contained in the flat-file XSD when generating VAXs, to permit changes to field, component, and/or subcomponent values in the VAXs, and the like. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the present systems and methods is intended to comprise, without being limited to, these and any other suitable types of memory.

The schema generator 1104 is further operatively coupled to an artificial intelligence (AI) component 1110 that can make inferences regarding operation of the system 1100. For example, the Al component 1110 can infer a proper parsing algorithm to be employed when grouping XSD segments to generate a VAX. Additionally and/or alternatively, the AI component 1110 can be employed to determine an appropriate grouping methodology (e.g., sequence, choice, . . . ) to utilize when grouping segments, groups of segments, and the like. The preceding examples are illustrative in nature, and are not intended to limit the scope of the manner in which the Al component 1110 makes inferences or the number of inferences that can be made by the Al component 1110.

With reference to FIGS. 12-15, there are illustrated flowcharts in accordance with various aspects of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts can, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 12:
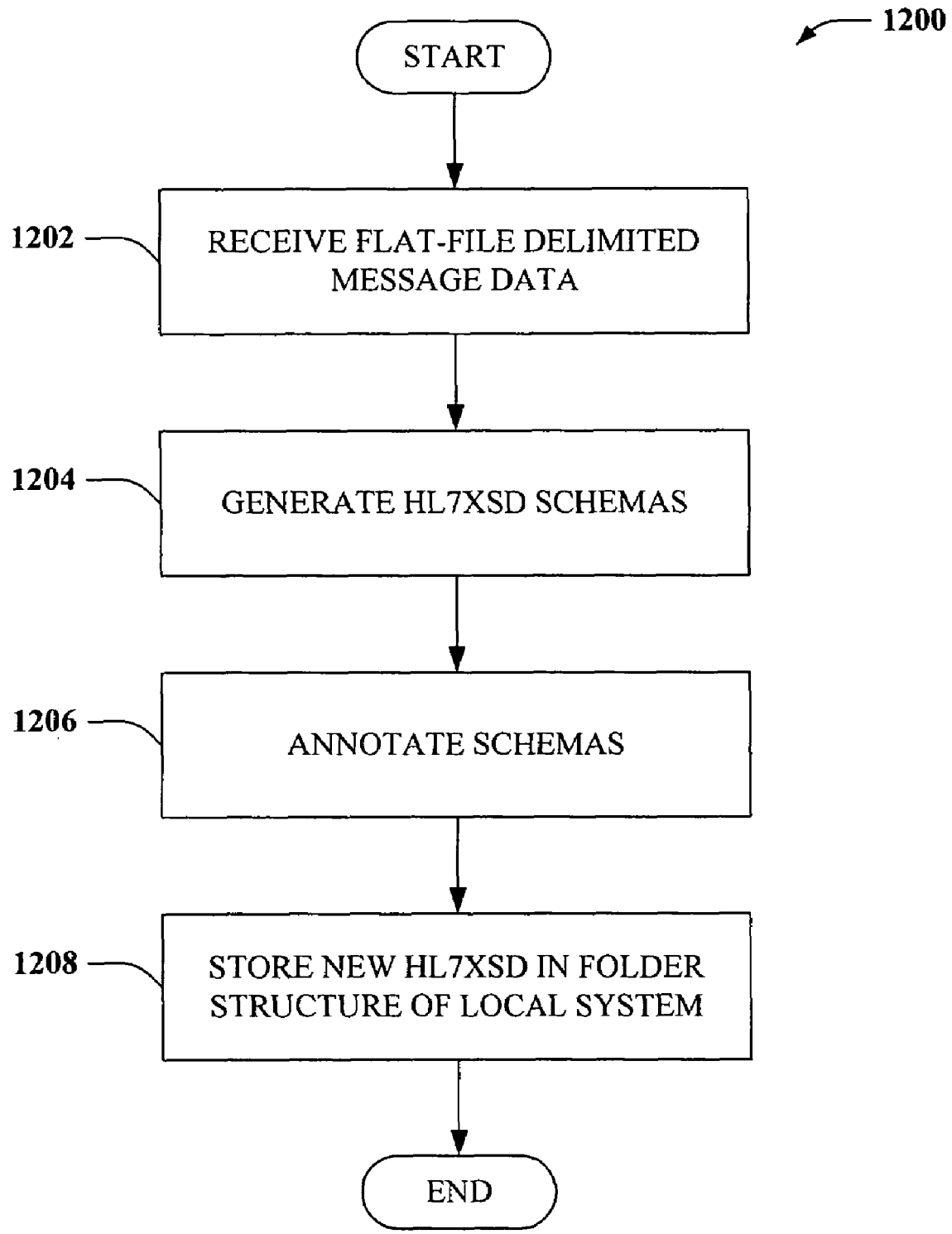
FIG. 12 illustrates a methodology 1200 for generating value-added XSDs in accordance with the subject invention.

Referring now to FIG. 12, there is illustrated a methodology 1200 for generating value-added XSDs in accordance with the subject invention. At 1202, flat-file delimited data, such as an HL7 document, can be received. Information contained in the flat-file message can be parsed according to delimiters defined in the message header and employed in the message body to separate message portions. Based on such delimiter information, at 1204, HL7XSD schemas can be generated, which can comprise a metadata schema that has information related to representations of segments, fields, components, and sub-components, as well as a business rule schema that comprises information related to predefined formatting rules for a specific business environment, such as a hospital. At 1206 the HL7XSD can be annotated using a stored template to generate a VAX. Annotations can provide information related to reorganization of delimited flat-file segments, fields, etc., groupings thereof (e.g., choice, sequence, . . . ), and the like. Once annotated, the HL7VAX can be stored in a created folder structure in a local file system at 1208. Fore example, the folder structures of FIGS. 3-5 can be representative of folder structure generated to store one or more VAXs.

Figure 13:
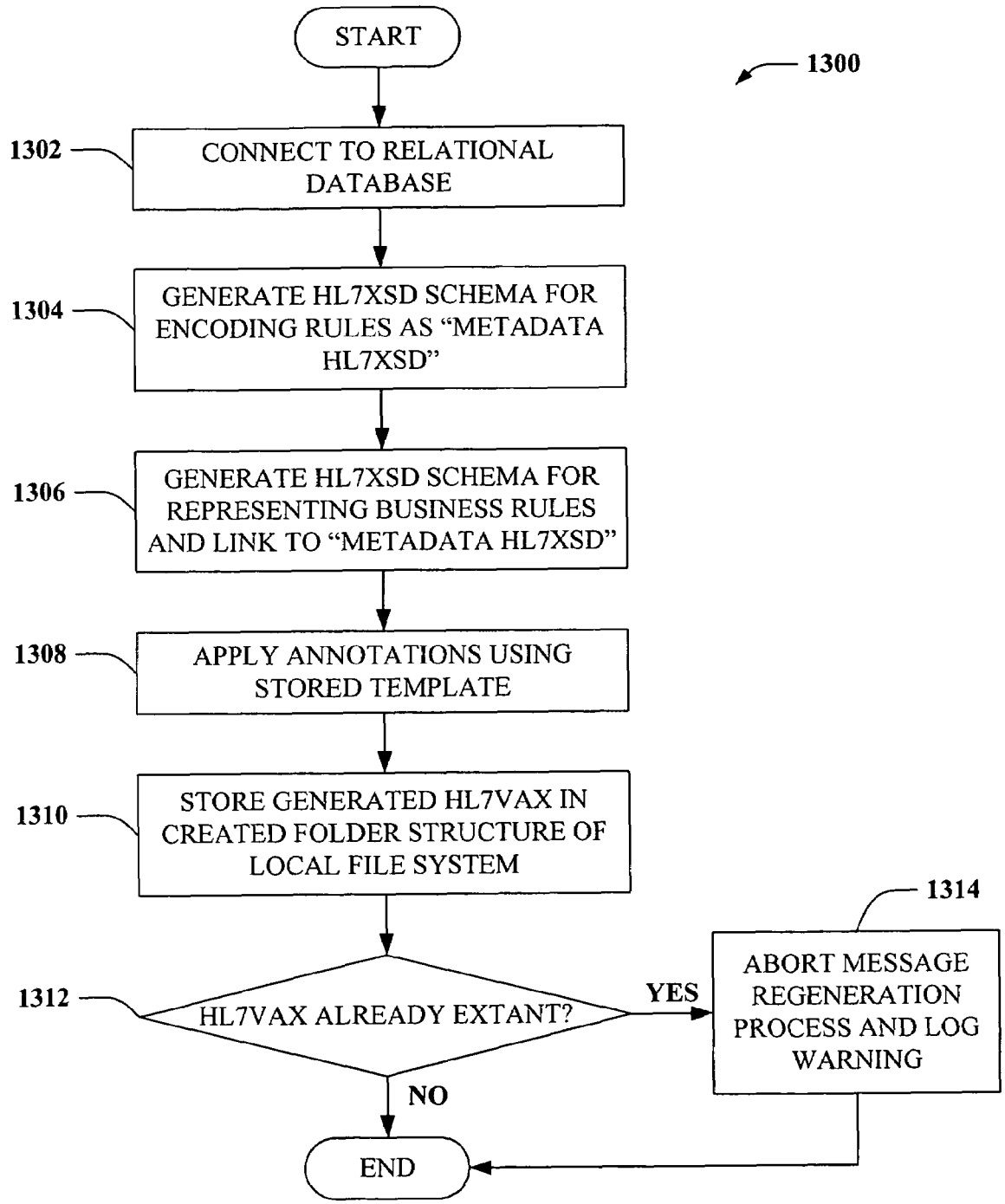
FIG. 13 is an illustration of a methodology 1300 for generating VAXs from flat-file delimited data in accordance with an aspect of the subject invention.

Referring now to FIG. 13, there is illustrated a methodology 1300 for generating VAXs from flat-file delimited data in accordance with an aspect of the subject invention. According to the methodology 1300, at 1302, a connection can be established with a relational database in which flat-file data and/or messages related thereto are stored. At 1304, a metadata XSD can be generated. The metadata XSD can comprise, for example, information related to segments and/or groups thereof in the flat-file message, data fields within segments, components within fields, sub-components of components, etc. At 1306, a business rule XSD can be generated and linked to the metadata XSD for the particular message and/or message type. Business rule information can comprise, for example, information that triggers events based on the message. For instance, a business rule can require an acknowledgement to be sent from an application that has received a message to an application that transmitted the message. At 1308, the combined business-rule-and-metadata XSD can be annotated using a stored template to created a value-added XSD. Annotations can include, for example, information related to VAX structure, business rules, groupings of segments, fields, etc., or any other suitable information that facilitates converting a message simultaneously into a plurality of messages suitable for delivery to a plurality of destinations. The VAX can then be stored in folder structure generated in a local file system at 1310. For example, a the tree-formatted folder structures of FIGS. 3-5 represent VAX storage structures that can be utilized to store the VAX generated at 1302-1310.

At 1312, a determination can be made regarding whether a VAX for the particular message and/or flat file data undergoing translation and transformation already exists. If it is determined that no such VAX already exists, the methodology can terminate. If it is determined that a VAX for the particular message type has already been created, then at 1314, message regeneration can be aborted and a warning can be logged. It is to be appreciated that checking for an extant VAX as described with regard to 1312 and 1314 can occur earlier in the methodology 1300 if desired, in order to mitigate unnecessary system resource consumption by generating a duplicate VAX.

Figure 14:
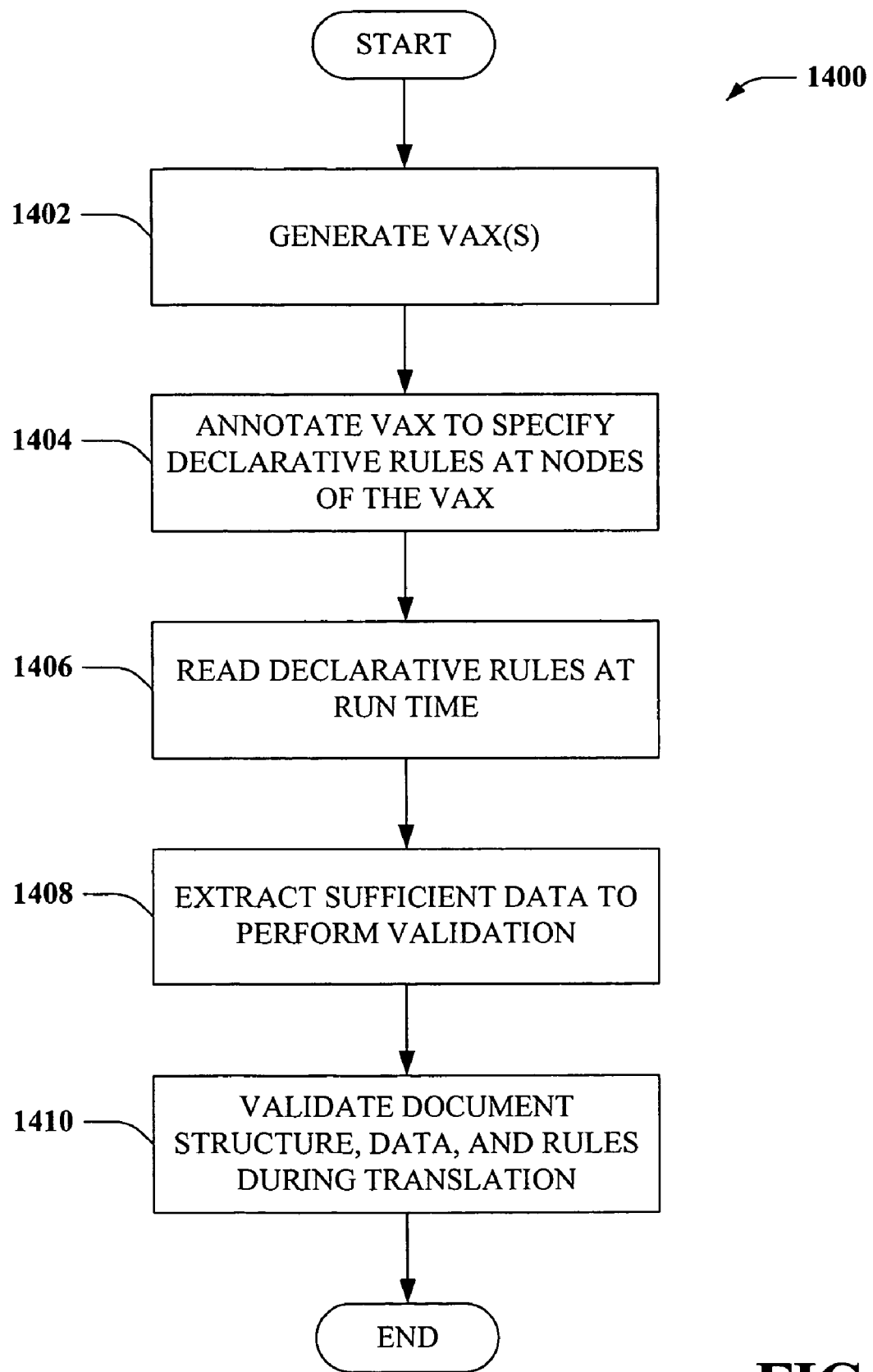
FIG. 14 is an illustration of a methodology 1400 for formally describing structured documents along with complex validation rules using value-added XSDs (VAXs), in accordance with an aspect of the subject invention.

FIG. 14 is an illustration of a methodology 1400 for formally describing structured documents along with complex validation rules using value-added XSDs (VAXs), in accordance with an aspect of the subject invention. At 1402, one or more VAXs can be generated, such as described with reference to the methodologies presented with regard to FIGS. 12 and 13. At 1404, declarative rules related to document validation can be specified at particular nodes in the VAX. Such declarative rule specification can be performed by annotating the VAX, as described with regard to FIG. 9, the description of which sets forth an example of pseudo-code for such an annotation. For instance, when the engine encounters an XSD annotation in the VAX such as "if exists (/Xpath1) then exists (/Xpath2), the engine can collect values associated with the data fileds /Xpath1 and /Xpath2 into a data dictionary as data enters traversing a data node that is represented by a schema node containing the annotation. A check can then be performed represented by the validation rule as data exits the traversal using data in the dictionary.

Declarative validation rule annotations can be read at 1406, at run time, when the VAX is being applied to a particular message or message type for which it was generated. At 1408, annotations can be applied to relevant portions of the message, and data can be extracted from the message to perform rule validation during message translation. For example, the entire message need not be analyzed when applying validation rules. Rather, only portions of the message or document to which the rules apply need to be extracted for validation. Finally, at 1410, document structure, data and business rules associated with document translation can be validated.

Figure 15:
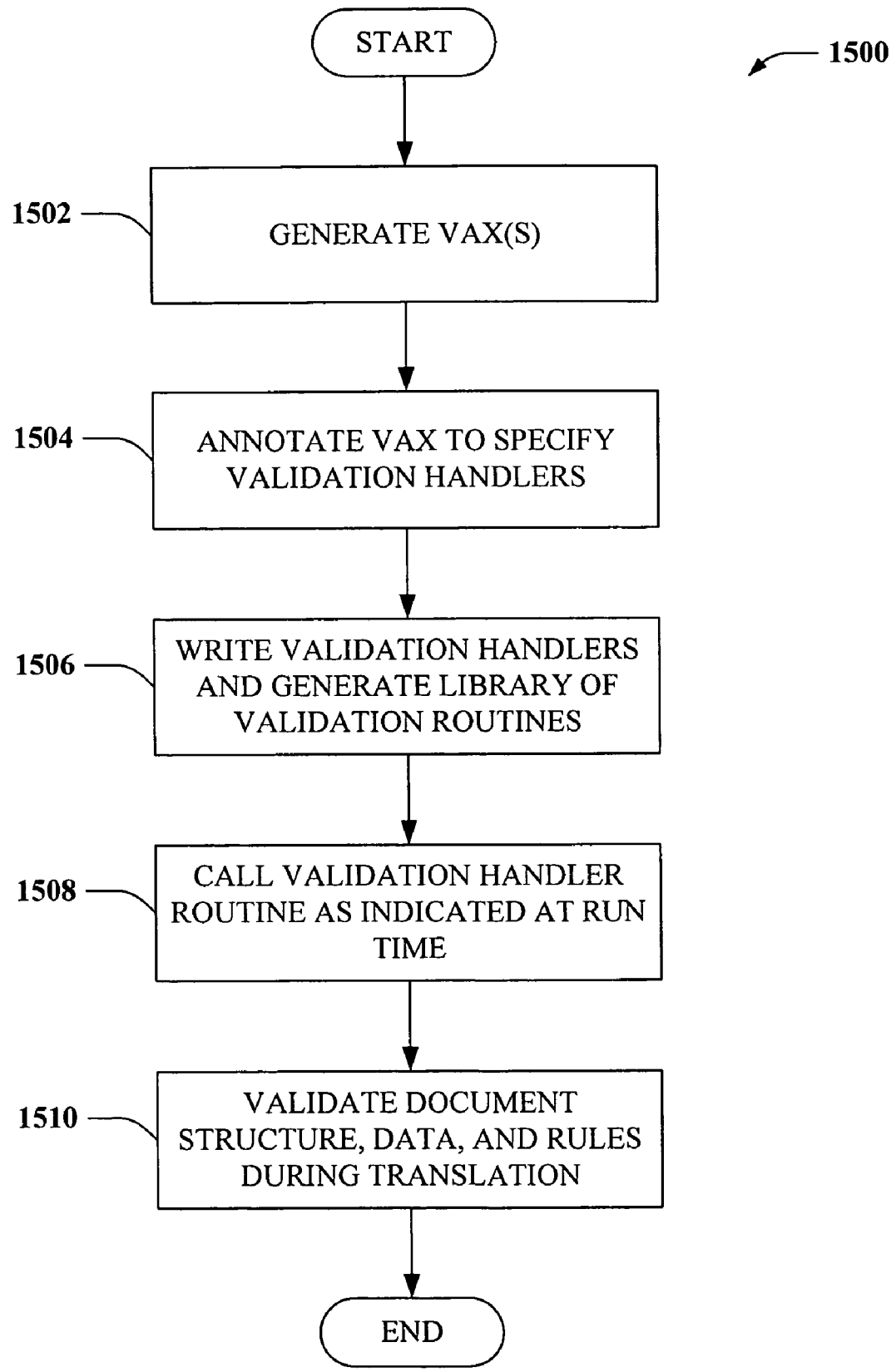
FIG. 15 is an illustration of a methodology 1500 for validating documents during translation to XML-formatted documents using validation handlers, in accordance with an aspect of the subject invention.

FIG. 15 is an illustration of a methodology 1500 for validating documents during translation to XML-formatted documents using validation handlers, in accordance with an aspect of the subject invention. At 1502, one or a plurality of VAXs can be generated, as described with reference to the methodologies presented with regard to FIGS. 12 and 13. At 1504, one or more VAXs can be annotated to include information related to specified validation handlers for particular nodes of the VAX (e.g., segments, fields, components, sub-components, . . . ). Validation handlers can be written at 1506, and provided as a library of predefined routines that facilitate performing validation of document structure, data, and/or translation/transformation rules associated therewith. It is to be appreciated that the validation handler routines can be written at any time prior to 1506, so long as the library of validation routines is provided at 1506. A call to one or more validation handler routines can be made at 1508 upon recognition of the validation handler annotation in the VAX, and the routine can be performed at run time. For instance, when the engine encounters an XSD annotation in the VAX such as "Call validator.dll!routine1, /Xpath1, /Xpath2", the engine can collect values associated with the data fileds /Xpath1 and /Xpath2 into a data dictionary as data enters traversing a data node that is represented by a schema node containing the annotation. The handler routine named validator.dll can then be loaded into a main memory and routine1 can be run, passing the data values from the dictionary as data exits the traversal. The engine can utilize values returned from the routine to determine if data in the document is valid according to the schema.

At 1510, the message and/or document can be validated (e.g., a structure thereof, data therein, and/or translation/transformation rules associated therewith can be validated) while it is being translated from flat-file format to XML format for delivery to a destination application. In this manner, the methodology 1500 can facilitate efficient single-pass translation of the message while concurrently providing complex structure, data, and rule validation.

The subject invention (e.g., in connection with generating VAXs, validating documents, etc.) can employ various artificial intelligence based schemes for carrying out various aspects thereof. For example, a process for determining when a message requires a VAX, when and how to validate a message via annotations represented in the VAX, etc., can be facilitated via an automatic classifier system and process. Moreover, where the message is of a type that is likely to be transmitted frequently and to multiple destination applications and/or is likely to be updated or modified often, the classifier can be employed to determine which internal portions of the VAX related thereto require modification, validation, etc.

A classifier is a function that maps an input attribute vector, $x=(x_1, x_2, x_3, x_4, x_n)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of relational databases and schema generation, for example, attributes can be data entries or other data-specific attributes derived from the data entries (e.g., database tables, the presence/identity of delimiters, validation annotations, . . . ), and the classes are categories or areas of interest (e.g., segments, fields, components, sub-components, business rules, . . . ).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, e.g., naive Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria when a VAX is generated, when it is regenerated (i.e., updated), which portions of the VAX are to be regenerated, etc. The criteria can include, but is not limited to, business rules associated with a particular environment and/or application in which the subject invention is employed, a frequency with which messages require modification, validation of messages, etc.

Figure 16:
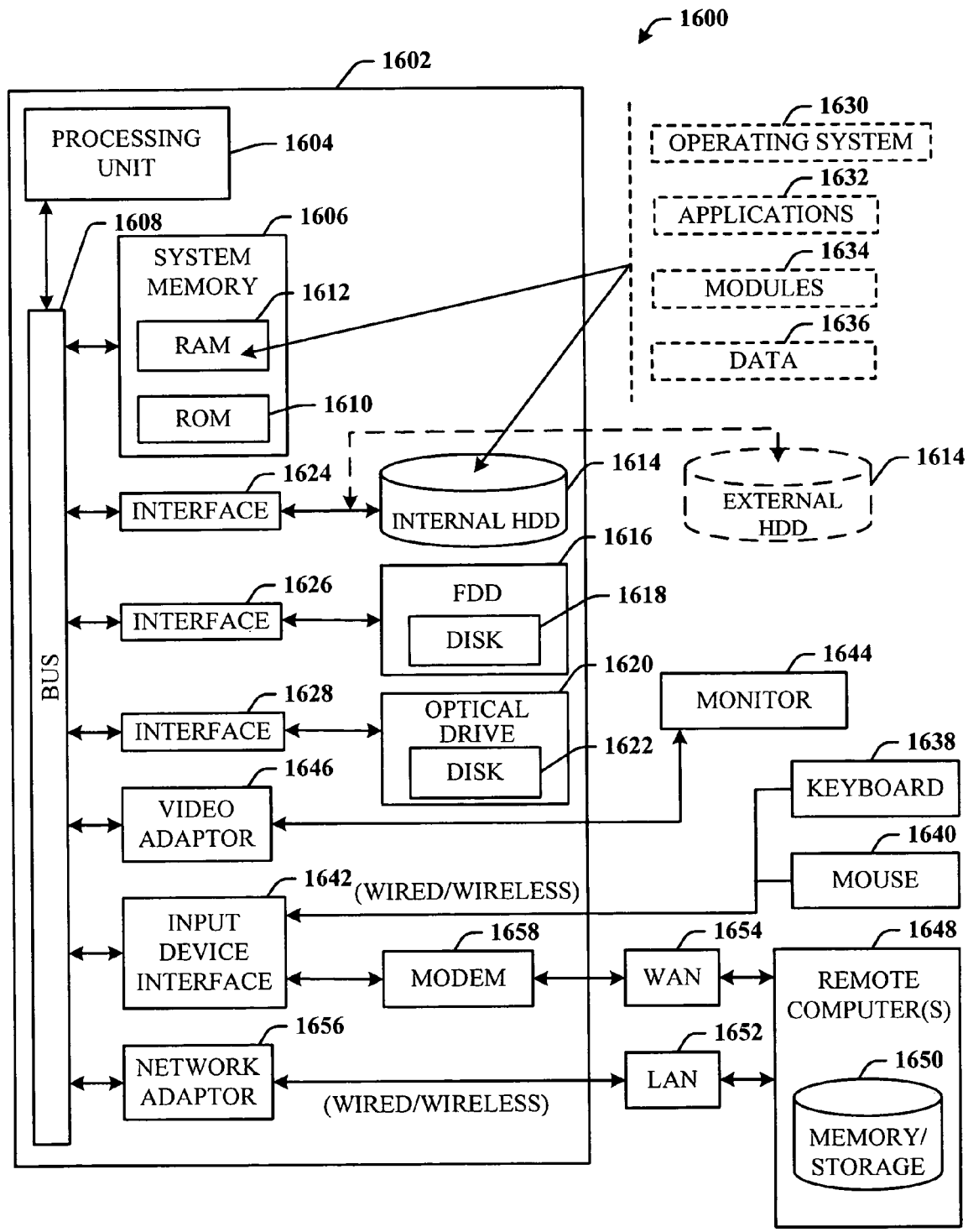
FIG. 16 illustrates a block diagram of a computer operable to execute the disclosed architecture.

Referring now to FIG. 16, there is illustrated a block diagram of a computer operable to execute the disclosed architecture. In order to provide additional context for various aspects of the subject invention, FIG. 16 and the following discussion are intended to provide a brief, general description of a suitable computing environment 1600 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 16, there is illustrated an exemplary environment 1600 for implementing various aspects of the invention that includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read only memory (ROM) 1610 and random access memory (RAM) 1612. A basic input/output system (BIOS) is stored in a nonvolatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that the subject invention can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1602 is connected to the local network 1652 through a wired and/or wireless communication network interface or adapter 1656. The adaptor 1656 may facilitate wired or wireless communication to the LAN 1652, which may also include a wireless access point disposed thereon for communicating with the wireless adaptor 1656. When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 17:
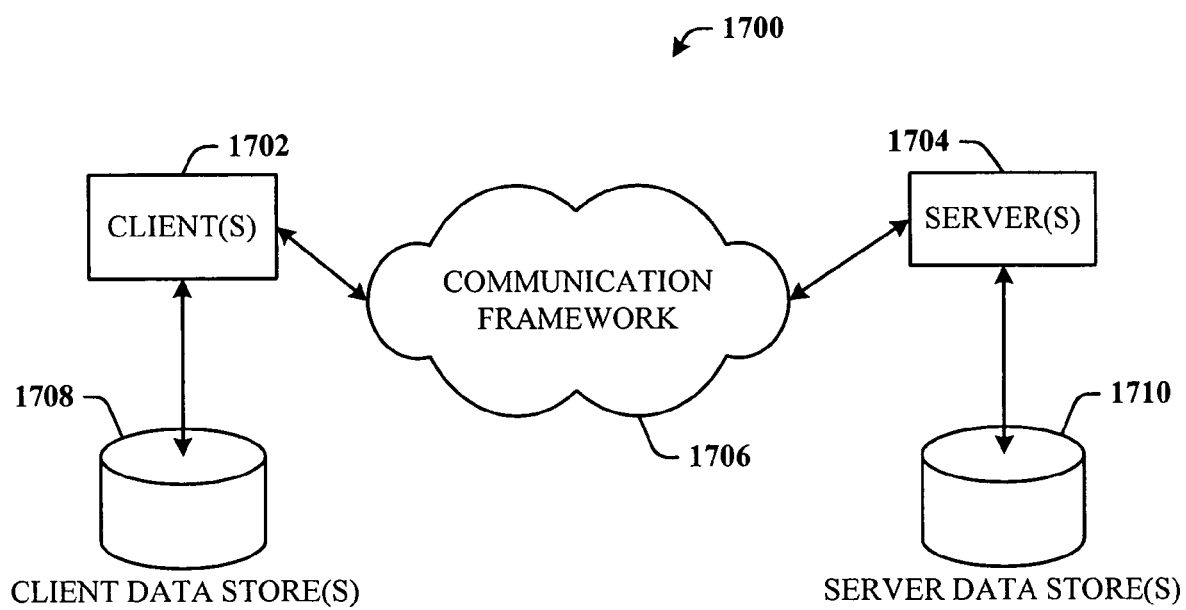
FIG. 17 illustrates a schematic block diagram of an exemplary computing environment in accordance with the subject invention.

Referring now to FIG. 17, there is illustrated a schematic block diagram of an exemplary computing environment 1700 in accordance with the subject invention. The system 1700 includes one or more client(s) 1702. The client(s) 1702 can be hardware and/or software (e.g., threads, processes, computing devices). The client(s) 1702 can house cookie(s) and/or associated contextual information by employing the subject invention, for example. The system 1700 also includes one or more server(s) 1704. The server(s) 1704 can also be hardware and/or software (e.g., threads, processes, computing devices). The servers 1704 can house threads to perform transformations by employing the subject invention, for example. One possible communication between a client 1702 and a server 1704 can be in the form of a data packet adapted to be transmitted between two or more computer processes. The data packet may include a cookie and/or associated contextual information, for example. The system 1700 includes. a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates formally describing structured documents and complex validation rules using extensible markup language schema definitions (XSDs), comprising:
    an integration engine that parses an incoming structured document and gleans information related to document structure;
    a schema generation component that constructs an XSD schema based at least in part on structural information related to the document and annotates at least one node of the XSD schema with validation rules to create a value-added XSD (VAX), the validation rules comprise structure rules that validate syntax of XML data generated in accordance with the VAX, the validation rules further include data value rules that validate non-XSD data types and business rules that validate at least co-existence requirements;
    a validation component that reads annotations in the VAX at run time to validate document structure, business rules and data values during translation of the document from a structured format to an XML format, the validation component includes a validation handler component that reads validation handlers in the annotations to validate document structure, business rules and data values, the validation handler component comprises one or more predefined validation routines stored in a library and called as directed by a read annotation; and
    a processor coupled to a memory.

2. The computer-implemented system of claim 1, the structured document is delimited according to ER7 encoding rules.

3. The computer-implemented system of claim 2, the structured document is an HL7 message.

4. The computer-implemented system of claim 2, the schema generation component organizes the XSD according to delimiter information obtained from the structured document when the document is parsed.

5. The computer-implemented system of claim 1, the integration engine extracts and caches information related to an annotated node to perform rule validation.

6. The computer-implemented system of claim 5, the validation component reads the cached information during document translation and compares the cached information to the structure and data represented by the VAX to validate the structured document.

7. The computer-implemented system of claim 1, the validation component comprises a declarative validation component that provides declarative rules to the schema generator, the declarative rules are specified at nodes of the XSD as annotations when generating the VAX.

8. The computer-implemented system of claim 7, the validation component reads annotations in the VAX during translation of the structured document to validate information associated with the structured document.

9. A method of formally describing structured documents and validation rules using VAXs to facilitate single-pass document translation and validation, comprising:
   parsing an incoming structured document to generate an extensible markup language schema definition (XSD) therefore based at least in part on delimiter information obtained from a header associated with the structured document;
   annotating the XSD with validation rules for the structured document to generate a value-added XSD (VAX), the validation rules include structure rules, data value rules and business rules, the structure rules validate syntax of XML data generated in accordance with the VAX, the data value rules facilitate validation of non-XSD data types, the business rules provide validation of at least co-existence requirements;
   specifying validation handlers in annotations associated with nodes in the VAX, the validation handlers facilitate validation of the structured document, the validation handler is a validation routine stored in a library that can be called and implemented upon traversal of a an annotation that references the specified validation hander; and
   extracting data specified in VAX annotations from the structured document during translation to verify document structure, data values, and business rules associated with the document.

10. The method of claim 9, further comprising employing declarative validation rules in annotations associated with nodes the VAX.

11. The method of claim 9, further comprising employing a validation handler routine to perform a lookup of information associated with external sources and provide real-time validation of external information.

12. The method of claim 9, the structured document is a delimited flat-file HL7 message.

13. The method of claim 12, the HL7 message is delimited according to an ER7 encoding convention.

14. A system that facilitates formally describing structured documents with associated validation rules using extensible markup language schema definitions (XSDs) schemas comprising:
   means for parsing a structured document to generate an XSD that describes the document based at least in part on delimiter information associated with the structured document, the structured data is flat-file delimited data, the flat file delimited data comprises one ore more segments that each include one or more fields delimited by a delimiter symbol, the one or more fields comprise at least one of complex data types, simple data types or a combination thereof;
   means for annotating the XSD schema with validation rule information to create a value-added XSD (VAX), that describes the structured document, the validation rule information comprises structure rules, data value rules and business rules, the structure rules include syntax validation rules related to validating a syntax of the VAX, the data value rules include data type validation rules that validates at least non-XSD data types, the business rules represent encoding logic germane to specific source or destination applications that transmit and receive messages manipulated based upon the VAX and comprise at least conditional compulsory existence rules that specify which fields of the one or more fields of the flat-file delimited data must co-exist;
   means for specifying validation handlers in annotations associated with nodes in the VAX, the validation handlers facilitate validation of the structured document, the validation handler is a validation routine stored in a library that can be called and implemented upon traversal of a an annotation that references the specified validation hander; and
   means for applying the VAX to the structured document during translation of the document to validate the structure, data values, and one or more business rules associated with the structured document and included within the VAX in a single pass; and
   means for processing the aforementioned.

15. The system of claim 14, further comprising means for at least one of providing declarative validation rules in VAX annotations and providing a validation handler routine library that can be called when a validation handler routine is specified in an annotation encountered during translation of the structured document according to the VAX.

16. The computer-implemented system of claim 1, the VAX includes a time field relative to the business rules, the time field defines a period in which at least one business rule is active.

* * * * *